(12) United States Patent
Hattori et al.

(10) Patent No.: US 11,161,141 B2
(45) Date of Patent: Nov. 2, 2021

(54) COATING DEVICE CONFIGURED TO APPLY A COATING AGENT TO AN OBJECT AND DETECT A SHAPE OF THE OBJECT AFTER THE APPLICATION OF THE COATING AGENT TO THE OBJECT

(71) Applicant: MAZDA MOTOR CORPORATION, Hiroshima (JP)

(72) Inventors: Hiroaki Hattori, Hiroshima (JP); Masanori Takasaki, Hatsukaichi (JP); Masakazu Tsuji, Higashihiroshima (JP); Go Ishizaki, Hiroshima (JP); Yasuhide Fukuda, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 23 days.

(21) Appl. No.: 16/496,763

(22) PCT Filed: Feb. 26, 2018

(86) PCT No.: PCT/JP2018/007037
§ 371 (c)(1),
(2) Date: Sep. 23, 2019

(87) PCT Pub. No.: WO2018/180105
PCT Pub. Date: Oct. 4, 2018

(65) Prior Publication Data
US 2020/0206773 A1    Jul. 2, 2020

(30) Foreign Application Priority Data

Mar. 30, 2017 (JP) .............................. JP2017-069345
Mar. 30, 2017 (JP) .............................. JP2017-069346

(51) Int. Cl.
*B05C 11/10* (2006.01)
*B05C 5/02* (2006.01)
(Continued)

(52) U.S. Cl.
CPC ............ *B05C 11/10* (2013.01); *B05B 12/084* (2013.01); *B05C 5/02* (2013.01); *B05C 11/1005* (2013.01);
(Continued)

(58) Field of Classification Search
CPC .......... B25J 19/022; G03C 1/74; G05B 19/19; G05B 2219/45013
See application file for complete search history.

(56) References Cited

U.S. PATENT DOCUMENTS 4,734,572 A    3/1988   Gorman
5,465,037 A    11/1995   Huissoon et al.
(Continued)

FOREIGN PATENT DOCUMENTS

CN         1531464 A    9/2004
CN      101433887 A    5/2009
(Continued)

OTHER PUBLICATIONS

International Search Report issued in PCT/JP2018/007037; dated May 15, 2018.
(Continued)

*Primary Examiner* — Karl Kurple
(74) *Attorney, Agent, or Firm* — Studebaker & Brackett PC

(57) ABSTRACT

The present application discloses a coating device including: a coating gun configured to apply a coating agent to an object; a sensor device configured to form a detection area in which the coating agent is detected on the object; a bracket on which the coating gun and the sensor device are mounted; and a robot configured to hold and rotate the bracket about a predetermined first axis of rotation. When the robot rotates the bracket from a first rotational position, at which the coating gun applies the coating agent to a
(Continued)

coating position on the object, to a second rotational position in which the bracket is angularly changed by a predetermined rotational angle about the first axis of rotation, the detection area overlaps with the coating position.

10 Claims, 23 Drawing Sheets

(51) Int. Cl.
  *B05B 12/08* (2006.01)
  *B05D 1/26* (2006.01)
  *B05D 1/28* (2006.01)
  *B25J 9/16* (2006.01)
  *B25J 11/00* (2006.01)
  *B62D 65/06* (2006.01)

(52) U.S. Cl.
  CPC ............ *B05C 11/1021* (2013.01); *B05D 1/26* (2013.01); *B05D 1/28* (2013.01); *B25J 9/1679* (2013.01); *B25J 9/1694* (2013.01); *B25J 11/0075* (2013.01); *B62D 65/06* (2013.01); *Y10S 118/02* (2013.01)

(56) References Cited

U.S. PATENT DOCUMENTS

| | | | |
|---|---|---|---|
| 2003/0140671 A1* | 7/2003 | Lande | B05D 1/265 |
| | | | 72/46 |
| 2004/0011284 A1 | 1/2004 | Schucker | |
| 2007/0000442 A1 | 1/2007 | Schucker | |
| 2010/0180711 A1 | 7/2010 | Kilibarda et al. | |
| 2011/0170946 A1* | 7/2011 | Schneegans | B23K 26/037 |
| | | | 403/271 |
| 2011/0262622 A1 | 10/2011 | Herre et al. | |
| 2016/0273110 A1 | 9/2016 | Sanda et al. | |
| 2018/0250955 A1 | 9/2018 | Herre et al. | |
| 2019/0193421 A1 | 6/2019 | Herre et al. | |
| 2019/0291660 A1* | 9/2019 | Haberl | B32B 5/026 |
| 2020/0078811 A1* | 3/2020 | Hattori | B05C 5/0204 |

FOREIGN PATENT DOCUMENTS

| | | | |
|---|---|---|---|
| CN | 101693229 A | 4/2010 | |
| CN | 102224012 A | 10/2011 | |
| CN | 203155488 U | 8/2013 | |
| CN | 105986252 A | 10/2016 | |
| EP | 0 678 066 A1 | 10/1995 | |
| EP | 2 719 997 A2 | 4/2014 | |
| EP | 271997 * | 4/2014 | ............ B05C 11/00 |
| JP | H01-184065 A | 7/1989 | |
| JP | H05-056275 U | 7/1993 | |
| JP | H05-338394 A | 12/1993 | |
| JP | H08-010676 A | 1/1996 | |
| JP | 2001-149841 A | 6/2001 | |
| JP | 2006-122740 A | 5/2006 | |
| JP | 2007-054727 A | 3/2007 | |
| JP | 2008-229444 A | 10/2008 | |
| JP | 2015-199034 A | 11/2015 | |

OTHER PUBLICATIONS

Extended European Search Report issued in EP 18 777 134.0 by the European Patent Office dated Apr. 30, 2020, which is related to U.S. Appl. No. 16/496,763.

An Office Action issued by the China National Intellectual Property Administration dated Sep. 7, 2020, which corresponds to Chinese Patent Application No. 201880020519.2 and is related to U.S. Appl. No. 16/496,763 with English language translation.

* cited by examiner

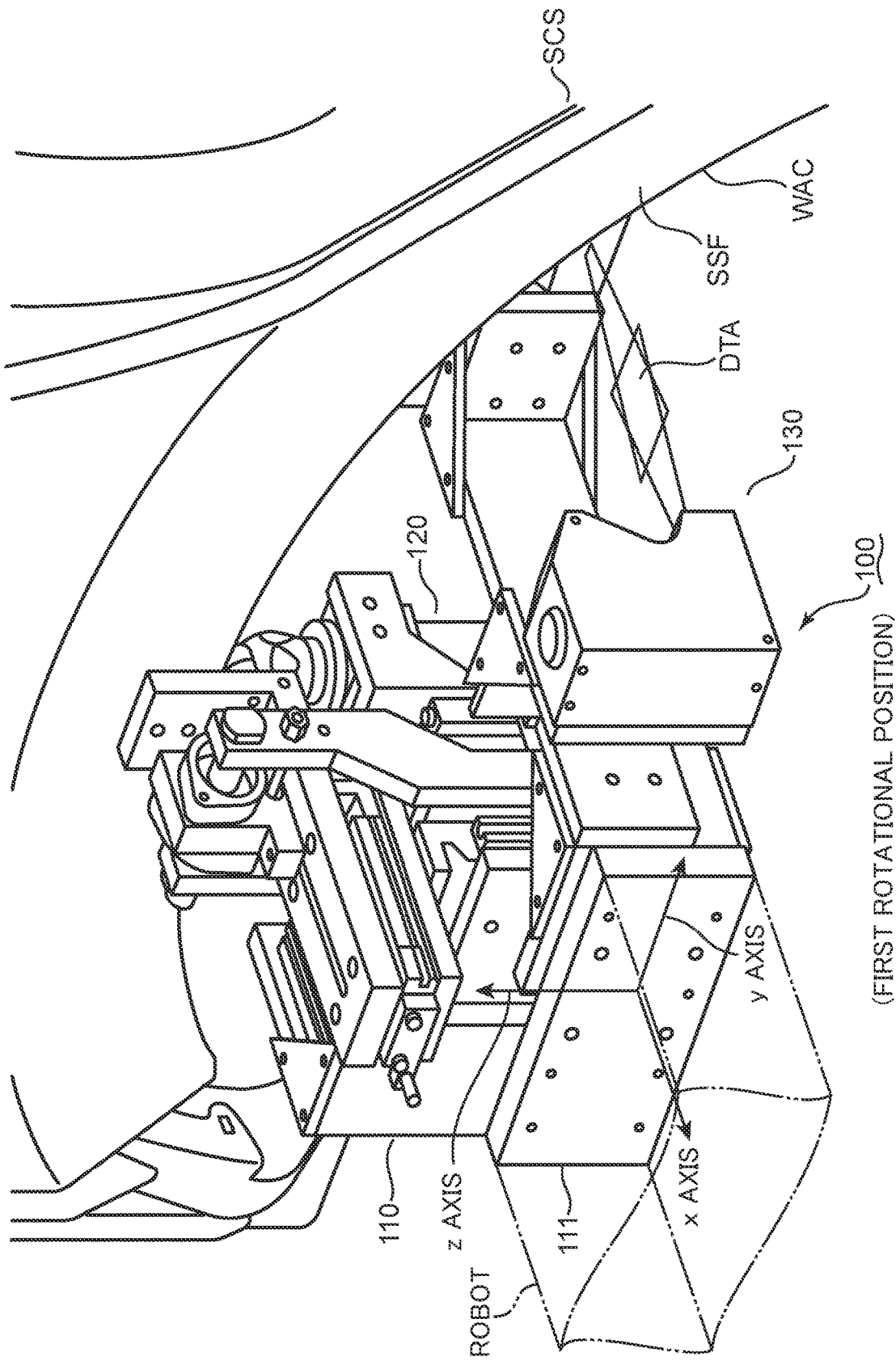

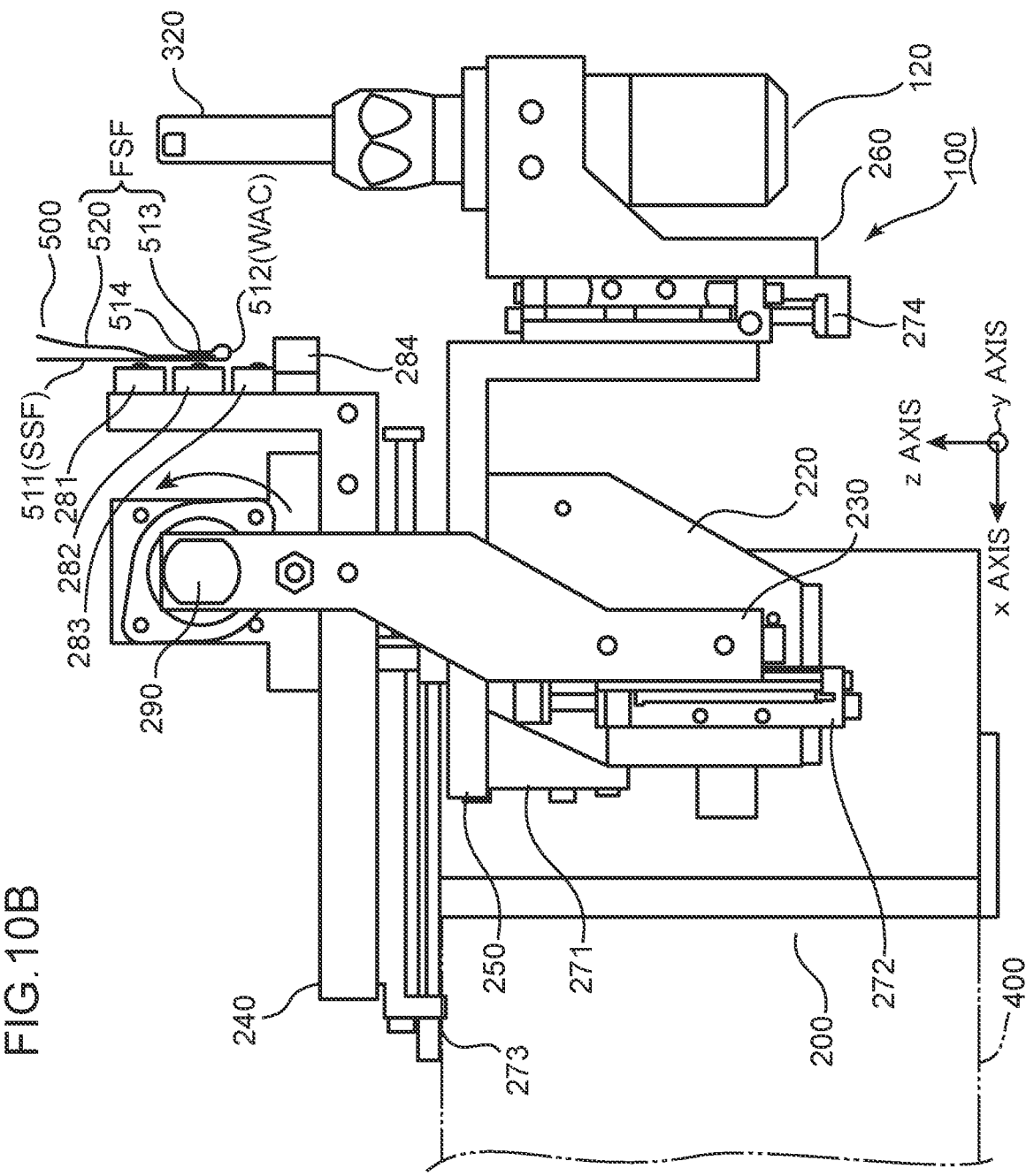

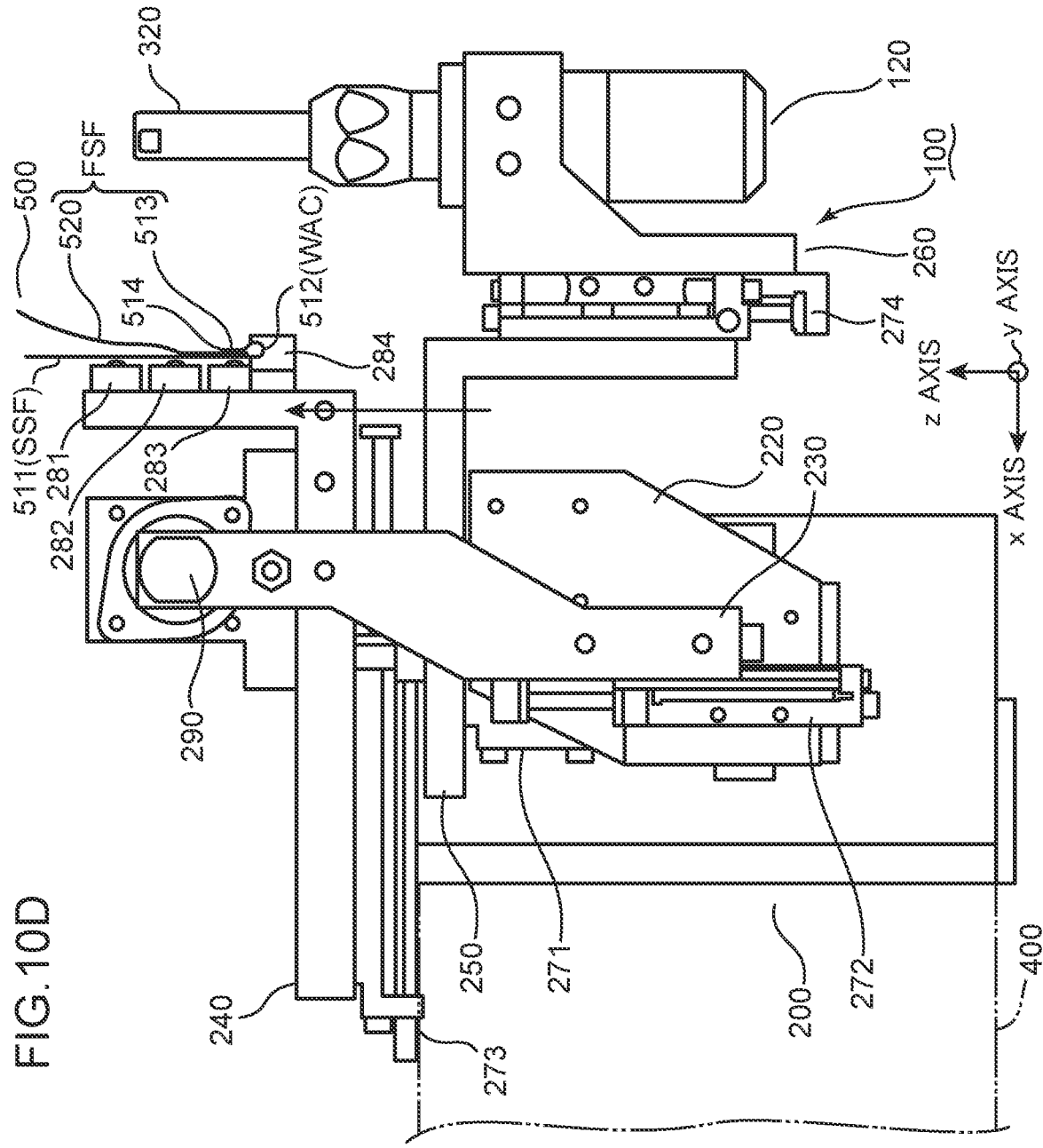

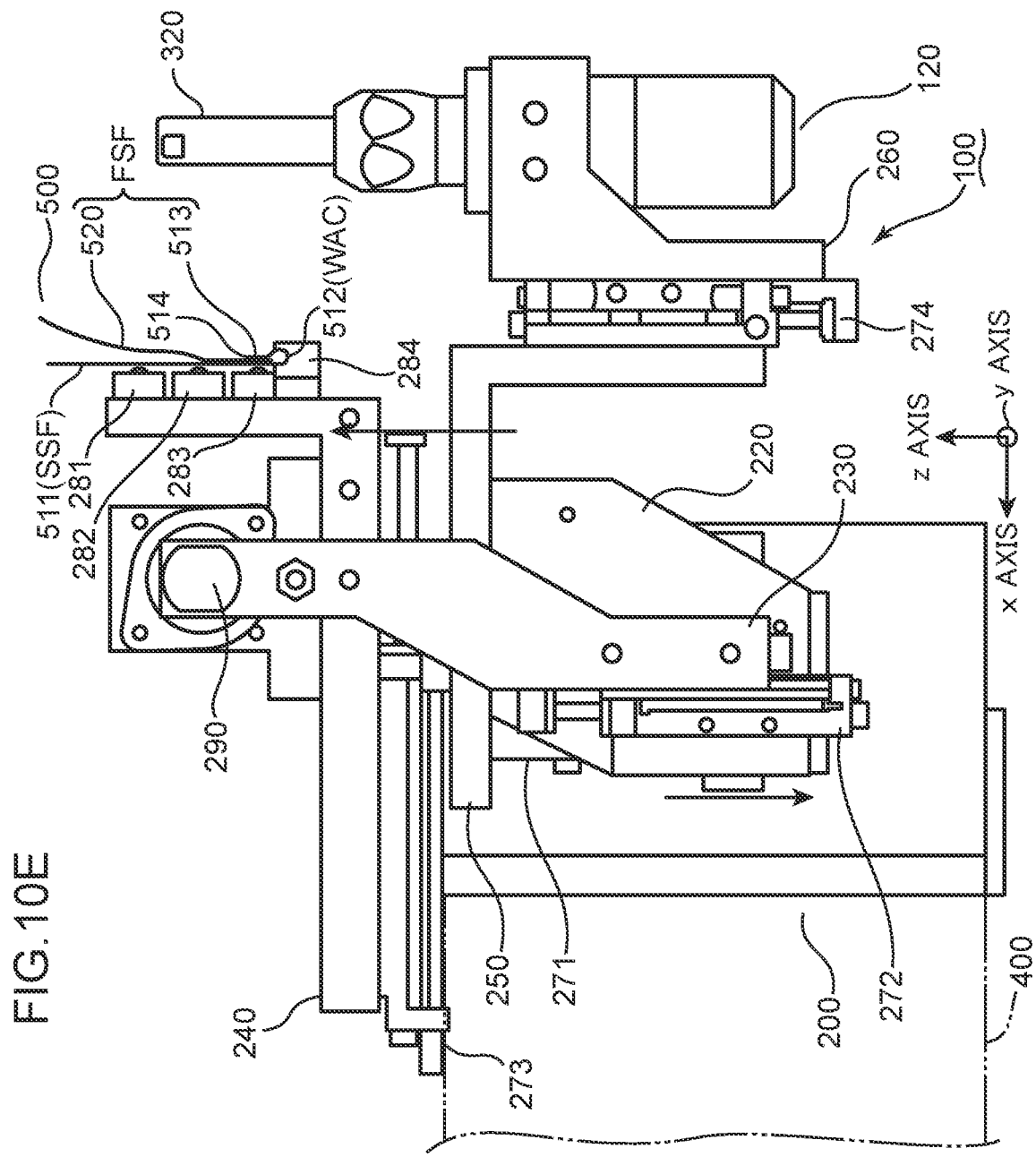

COATING DEVICE CONFIGURED TO APPLY A COATING AGENT TO AN OBJECT AND DETECT A SHAPE OF THE OBJECT AFTER THE APPLICATION OF THE COATING AGENT TO THE OBJECT

TECHNICAL FIELD

The present invention relates to a coating device and a coating method for applying a coating agent.

BACKGROUND ART

A coating agent may be applied to an object for the purpose of rust prevention, waterproofing and painting. Patent Document 1 discloses a coating device for applying a sealing agent to a hem portion formed on a vehicle.

An operator often inspects whether or not the sealing agent is appropriately applied after the application of the sealing agent. In this case, it is necessary for the operator to remove the coating device from an operation position and install an inspection device near the object. Alternatively, it is necessary for the operator to convey the object to the inspection device. Accordingly, the operator has to spend a large effort to inspect the coating agent.

In addition, it is necessary for the operator to accurately set a positional relationship between the object and the inspection device. When the positional relationship between the object and the inspection device is not so accurate, the inspection data acquired by the inspection device becomes inaccurate.

DOCUMENT LIST

Patent Document

Patent Document 1: JP 2015-199034 A

SUMMARY OF INVENTION

It is one object of the present invention to provide techniques which allow an operator to accurately and easily inspect whether or not a coating agent is appropriately applied.

A coating device according to one aspect of the present invention includes: a coating gun configured to apply a coating agent to an object; a sensor device configured to form a detection area in which the coating agent is detected on the object; a bracket on which the coating gun and the sensor device are mounted; and a robot configured to hold and rotate the bracket about a predetermined first axis of rotation. When the robot rotates the bracket from a first rotational position, at which the coating gun applies the coating agent to a coating position on the object, to a second rotational position in which the bracket is angularly changed by a predetermined rotational angle about the first axis of rotation, the detection area overlaps with the coating position.

A coating method according to another aspect of the present invention includes: applying a coating agent from a coating gun to an object; rotating a bracket, on which the coating gun and a sensor device are mounted, about a predetermined first axis of rotation to make a detection area match the coating agent on the object to detect the coating agent on the object, the sensor device being configured to form the detection area; and detecting a shape of the coating agent on the object.

According to the aforementioned techniques, it is possible to accurately and easily inspect whether or not a coating agent is appropriately applied.

Other objects, technical features, and advantageous effects of the present invention will become more apparent with reference to the detailed description made below and attached drawings.

BRIEF DESCRIPTION OF DRAWINGS

FIG. 2A is a schematic perspective view of the coating device shown in FIG. 1.

FIG. 10B is a schematic side view of the coating device shown in FIG. 1.

FIG. 10D is a schematic side view of the coating device shown in FIG. 1.

FIG. 10E is a schematic side view of the coating device shown in FIG. 1.

DESCRIPTION OF EMBODIMENTS

An exemplary coating device is described below. Directional terms such as "left", "right", "up", "down", "front" and "rear" are used only for the purpose of clarifying the description. Accordingly, the principles of the present embodiment are not limited by these directional terms at all.

<First Embodiment>

A coating device in which a coating gun for applying a coating agent to an object and a detection device for detecting the applied coating agent are integrally incorporated facilitates application and detection of the coating agent. An exemplary coating device in which a coating gun and a detection device are integrally incorporated is described in the first embodiment.

Figure 1:
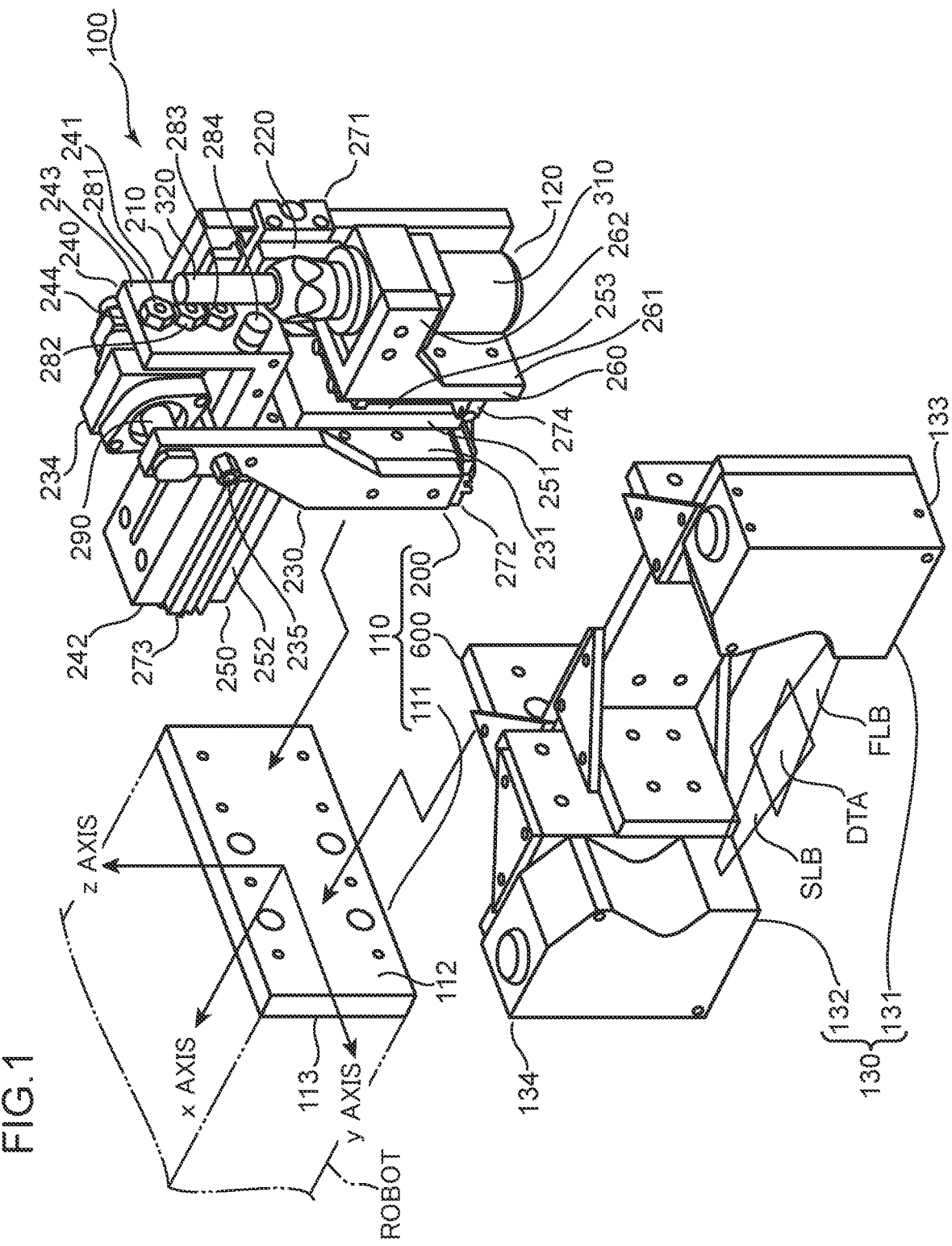
FIG. 1 is a schematic exploded perspective view of a coating device according to the first embodiment.

FIG. 1 is a schematic exploded perspective view of the coating device 100 according to the first embodiment. The coating device 100 is described with reference to FIG. 1.

FIG. 1 shows an x axis, a y axis and a z axis which are orthogonal to each other. The positive direction of the x axis is referred to as "leftward direction" in the following description. The negative direction of the x axis is referred to as "rightward direction" in the following description. The positive direction of the y axis is referred to as "rearward direction" in the following description. The negative direction of the y axis is referred to as "frontward direction" in the following description. The positive direction of the z axis is referred to as "upward direction" in the following description. The negative direction of the z axis is referred to as "downward direction" in the following description. However, the directions of the x, y and z axes may be dependent on operations of a robot (not shown). Accordingly, the principles of the present embodiment are not limited by these directional terms at all.

The coating device 100 includes a bracket 110, a coating gun 120, a sensor device 130 and a robot (not shown). The robot holds the bracket 110 on which the coating gun 120 and the sensor device 130 are mounted. The coating gun 120 applies a coating agent to an object (not shown). The sensor device 130 is used for measuring a shape of a layer of the coating agent on the object.

The bracket 110 on which the sensor device 130 and the coating gun 120 are mounted includes a bracket plate 111, a gun bracket 200 and a sensor bracket 600. The bracket plate 111 is a substantially rectangular plate member mounted on the robot. The gun bracket 200 and the sensor bracket 600 are mounted on the bracket plate 111. The coating gun 120 is mounted on the gun bracket 200. The sensor device 130 is mounted on the sensor bracket 600. The sensor bracket 600 on which the sensor device 130 is mounted and the gun bracket 200 on which the coating gun 120 is mounted are fixed to the bracket plate 111 mounted on the robot. Accordingly, the coating gun 120 and the sensor device 130 are held by the robot by way of the bracket 110.

The bracket plate 111 on which the sensor bracket 600 and the gun bracket 200 are mounted has a right surface 112, and a left surface 113 opposite to the right surface 112. The x axis extends in a direction at the right angle to the right and left surfaces 112, 113. The robot is connected to the left surface 113 of the bracket plate 111. The robot may rotate the bracket plate 111 about the x axis. The gun bracket 200 and the sensor bracket 600 are fixed to the right surface 112 of the bracket plate 111. The gun bracket 200 and the sensor bracket 600 are situated on the right surface 112 of the bracket plate 111 in the extension direction of the y axis. With regard to the present embodiment, the predetermined first axis of rotation is exemplified by the x axis.

The sensor device 130 mounted on the sensor bracket 600 includes a first optical sensor 131 and a second optical sensor 132. The first optical sensor 131 is mounted on the sensor bracket 600. The second optical sensor 132 is mounted on the sensor bracket 600 on the left of the first optical sensor 131. The sensor bracket 600 maintains a positional relationship between the first and second optical sensors 131, 132.

An object (not shown) to which a coating agent applied from the coating gun 120 adheres is situated in a space formed between the first and second optical sensors 131, 132. Accordingly, the object has a first surface (not shown) which faces the first optical sensor 131, and a second surface (not shown) which faces the second optical sensor 132. In short, the second surface is opposite to the first surface. The coating gun 120 applies the coating agent to the first surface. After application of the coating agent is completed, the first optical sensor 131 detects a position of the first surface, a shape of the first surface, a shape of the coating agent (a shape of a layer of the coating agent) on the first surface, and a position of a surface of the layer of the coating agent. After application of the coating agent is finished, the second optical sensor 132 detects a shape and a position of a surface of the second surface of the object. Accordingly, the sensor device 130 may detect a shape and a thickness of the object to which the coating agent has been applied.

With regard to the present embodiment, the sensor device 130 is formed of two optical sensors. However, the sensor device may be formed of other sensors (e.g. acoustic sensors) configured to detect the position and the shape of the coating agent on the object. Accordingly, the principles of the present embodiment are not limited to a particular sensor used as the sensor device.

The first optical sensor 131 of the sensor device 130 includes a sensor housing 133. Various optical parts such as an oscillator configured to oscillate a first laser beam FLB, and a photoreceptor configured to receive a reflection beam (not shown) reflected from the first surface of the object and generate an electric signal are situated in the sensor housing 133. Likewise, the second optical sensor 132 includes a sensor housing 134. Various optical parts such as an oscillator configured to oscillate a second laser beam SLB, and a photoreceptor configured to receive a reflection beam (not shown) reflected from the second surface of the object and generate an electric signal are stored in the sensor housing 134. With regard to the present embodiment, the laser sensors are used as the first and second optical sensors 131, 132 respectively. Accordingly, the sensor device 130 may detect the position and the shape of the coating agent on the object substantially without being affected by environmental light around the sensor device 130. However, other optical sensors may be used as the first and second optical sensors. Accordingly, the principles of the present embodiment are not limited to a particular kind of sensors used as the first and second optical sensors.

When the first and second optical sensors 131, 132 respectively radiate the first and second laser beams FLB, SLB in the absence of the object, the first laser beam FLB overlaps with the second laser beam SLB to form a planar detection area DTA. The detection area DTA is substantially in parallel to the x and y axes. The detection area DTA is used for detecting the positions and the shapes of the object and the coating agent on the object. While the positions and the shapes of the object and the coating agent on the object are detected by the sensor device 130, the object is situated across the detection area DTA. With regard to the present embodiment, the first light is exemplified by the first laser beam FLB. The second light is exemplified by the second laser beam SLB.

When the object is situated across the detection area DTA formed by the first and second laser beams FLB, SLB, the first laser beam FLB is radiated from the first optical sensor 131 to the first surface of the object. The first surface of the object (and the surface of the coating agent) reflects the first laser beam FLB. The first optical sensor 131 receives a reflection beam of the first laser beam FLB, and generates a voltage signal in correspondence to the received reflection beam. A voltage signal generated by the first optical sensor 131 indicates the position and the shape of the first surface, and the position and the shape of the surface of the layer of the coating agent on the first surface.

When the object is situated across the detection area DTA, the second laser beam SLB is radiated from the second optical sensor 132 to the second surface of the object. The second surface of the object reflects the second laser beam SLB. The second optical sensor 132 receives a reflection beam of the second laser beam SLB, and generates a voltage signal in correspondence to the received reflection beam. The voltage signal generated by the second optical sensor 132 indicates the position and the shape of the second surface.

Figure 2B:
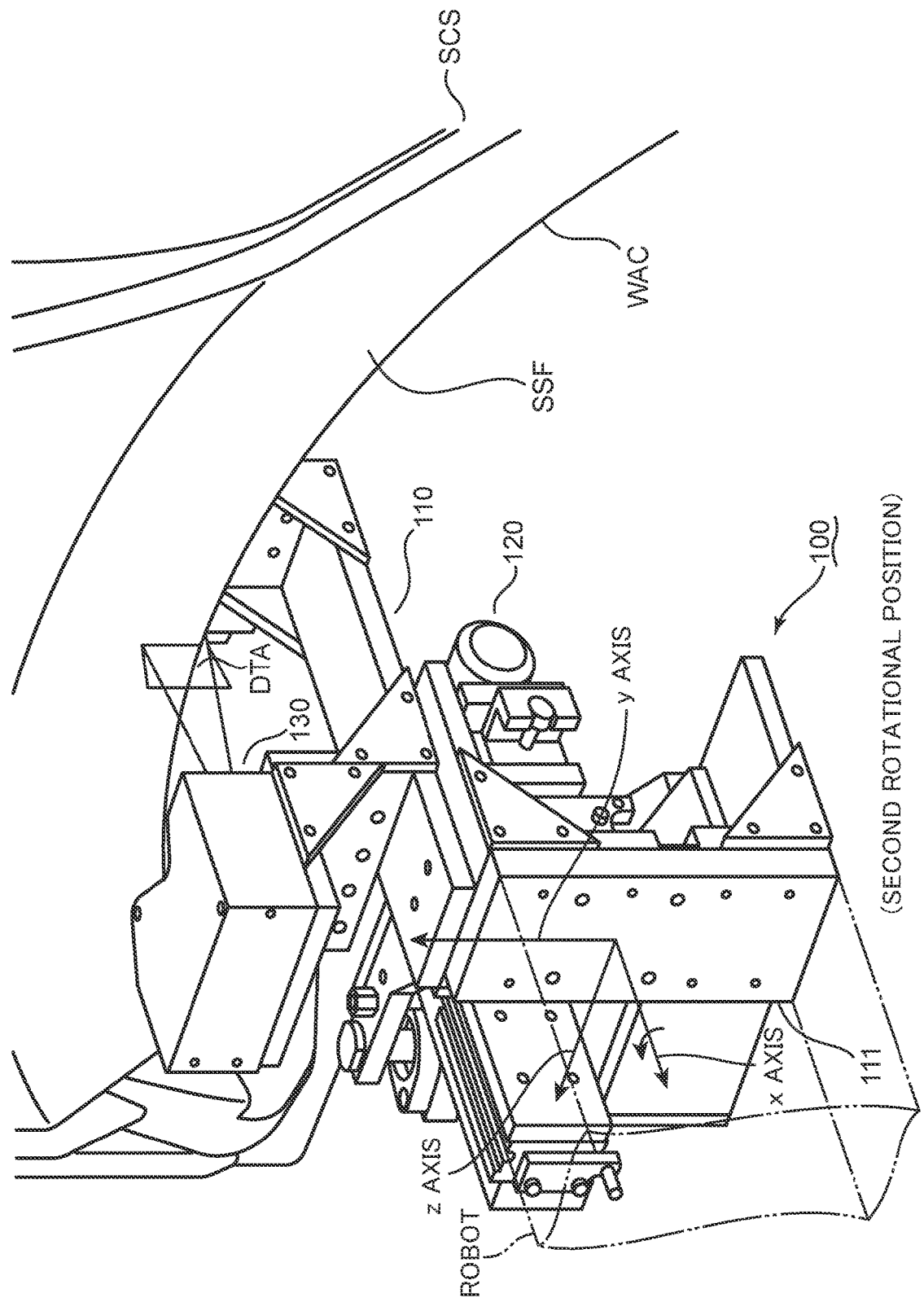
FIG. 2B is a schematic perspective view of the coating device shown in FIG. 1.

FIGS. 2A and 2B are schematic perspective views of the coating device 100. The coating device 100 is further described with reference to FIGS. 1 to 2B.

FIGS. 2A and 2B show a vehicle body SCS as the aforementioned object. A wheel arch WAC is formed as a part of the vehicle body SCS. The coating device 100 applies a sealing agent as the aforementioned coating agent to the vehicle body SCS along the wheel arch WAC. However, the coating device 100 may apply the coating agent to other objects. Accordingly, the principles of the present embodiment are not limited to a particular object.

A kind of the coating agent may be determined so that the coating agent fits a performance which is required for the object. When the rust prevention treatment to the object is required, the sealing agent is used as the coating agent, like the present embodiment. When the coloring treatment is required to the object, a paint is used as the coating agent. Accordingly, the principles of the present embodiment are not limited to a particular coating agent.

Like FIG. 1, each of FIGS. 2A and 2B shows the x, y and z axes. With regard to FIGS. 2A and 2B, the intersecting point of the x, y and z axes corresponds to the connecting portion at which the robot (not shown) is connected to the bracket 110 (i.e. the bracket plate 111). The directions of the x, y and z axes shown in FIG. 2A matches the directions of the x, y and z axes shown in FIG. 1. The direction of the x axis shown in FIG. 2B matches the direction of the x axis shown in FIGS. 1 and 2A respectively. The direction of the y axis shown in FIG. 2B matches the direction of the z axis shown in FIGS. 1 and 2A respectively. In short, FIGS. 2A and 2B indicate that the robot rotates the bracket plate 111 about the x axis by 90°. In the following description, the rotational position of the bracket 110 shown in FIG. 2A is referred to as "first rotational position". The rotational position of the bracket 110 shown in FIG. 2B is referred to as "second rotational position".

FIGS. 2A and 2B mainly show the aforementioned second surface SSF. The surface opposite to the second surface SSF is the aforementioned first surface (not shown). The second surface SSF forms the outer surface of the vehicle body SCS. The second surface SSF is substantially orthogonal to the x axis. The wheel arch WAC which forms the lower edge of the second surface SSF has an arcuate profile on an imaginary plane substantially in parallel to the y and z axes.

The bracket 110 is situated near the wheel arch WAC. When the bracket 110 is situated at the first rotational position near the wheel arch WAC, the coating gun 120 applies the sealing agent to a predetermined area on the first surface. Then, when the robot rotates the bracket plate 111 about the x axis by 90°, the detection area DTA overlaps with the aforementioned predetermined area (i.e. the area to which the sealing agent has been applied). At this time, the detection area DTA is substantially orthogonal to the second surface SSF. The lower end of the detection area DTA is positioned below the wheel arch WAC. The detection area DTA forms intersecting lines at predetermined heights from the wheel arch WAC with the first surface and the second surface SSF of the vehicle body SCS respectively. The height size of the predetermined area set on the first surface (i.e. application area of the sealing agent) when the bracket 110 is situated at the first rotational position is shorter than the intersecting line formed by the detection area DTA and the first surface.

In the second rotational position which is rotated from the first rotational position by 90°, the sensor device 130 detects the surface shape and the thickness of the vehicle body SCS around the wheel arch WAC. With regard to the present embodiment, the angular difference (i.e. the predetermined rotational angle) between the first and second rotational positions is 90°. However, the angular difference between the first and second rotational positions may be determined so that the angular difference meets a structure and/or a shape of the bracket on which the coating gun 120 and the sensor device 130 are mounted (e.g. 120° or 180°). Accordingly, the principles of the present embodiment are not limited to a particular angular difference between the first and second rotational positions.

The sealing agent is applied to the vehicle body SCS at the first rotational position. The layer of the sealing agent on the vehicle body SCS is detected at the second rotational position which is rotated from the first rotational position by 90°. Switching the posture of the coating device 100 between the first and second rotational positions is achieved by merely making the robot rotate the bracket 110 about the x axis. Accordingly, an operator may perform a coating step of applying the sealing agent and a detection step of detecting the applied sealing agent without changing the position of the vehicle body SCS and the reference position (i.e. the intersecting point of the x, y and z axes) of the robot. In short, a change from the coating step to the detection step may be performed easily and smoothly. In addition, the sealing agent may be detected on the vehicle body SCS accurately.

(Other Technical Features)

Other technical features of the coating device 100 are described below. However, the following description does not limit the principles of the aforementioned embodiment at all.

(Gun Bracket)

The gun bracket configured to hold the coating gun may have various structures and functions. The aforementioned gun bracket 200 (c.f. FIG. 2A) is movable along the wheel arch WAC with being continuously in contact with the second surface SSF. Accordingly, the position of the gun bracket 200 on the x axis is finely adjusted in response to a change of the surface shape of the second surface SSF. Accordingly, the gun bracket 200 allows the sealing agent to be applied without an excessively accurate teaching process. The structure of the gun bracket 200 is described below.

Figure 3:
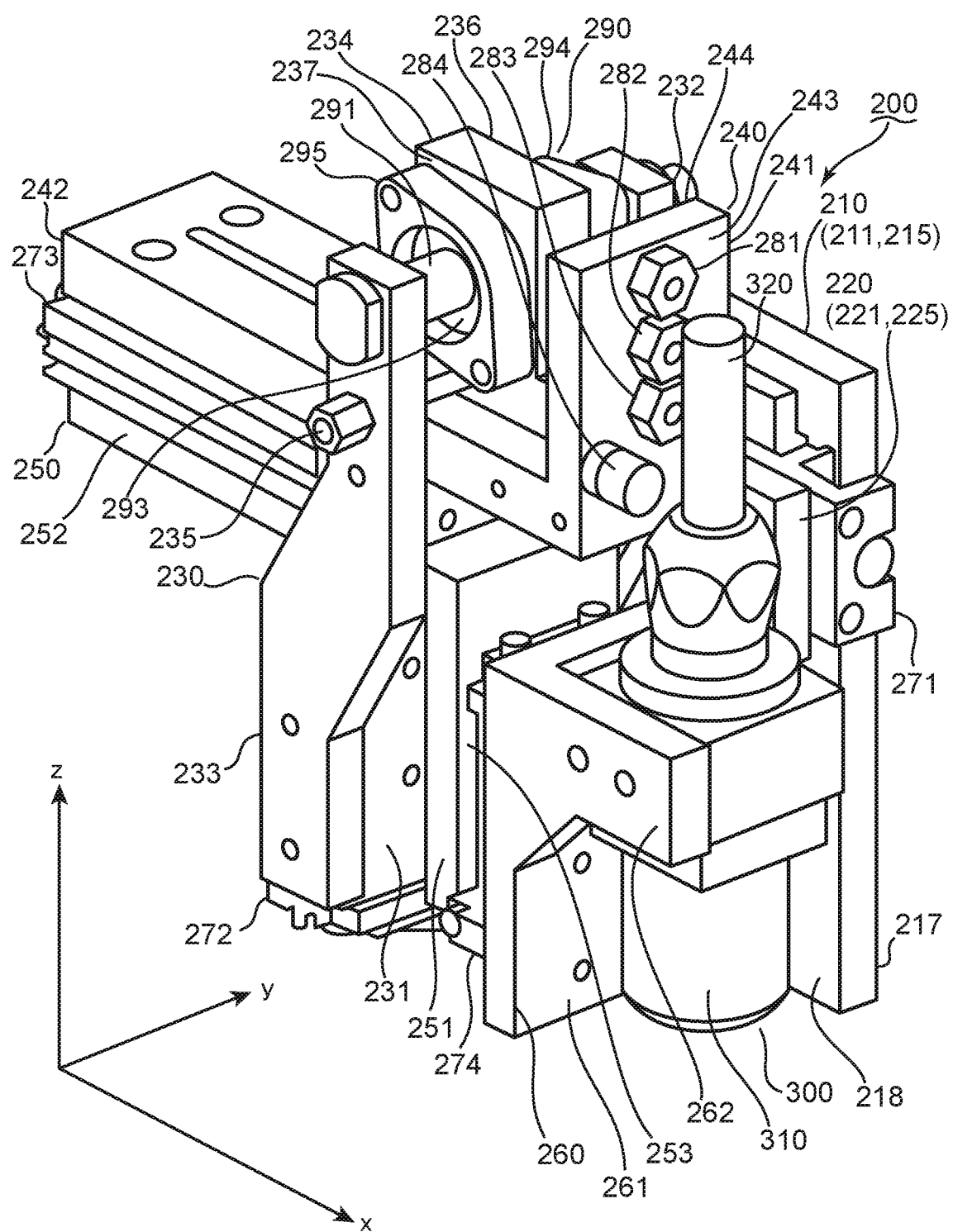
FIG. 3 is a schematic perspective view of a gun bracket of the coating device shown in FIG. 1.

FIG. 3 is a schematic perspective view of the gun bracket 200. The coating device 100 is described with reference to FIGS. 1 and 3.

As shown in FIGS. 1 and 3, the gun bracket 200 has six bracket members 210, 220, 230, 240, 250, 260, four guide sliders 271, 272, 273, 274, three ball rollers 281, 282, 283, a guide roller 284 and a swing shaft portion 290. The bracket members 210, 220, 230, 240, 250, 260 are used for fixing the guide sliders 271, 272, 273, 274, the ball rollers 281, 282, 283, the guide roller 284 and the swing shaft portion 290. The bracket members 210, 220, 230, 240, 250, 260 are also used for fixing the gun bracket 200 to the bracket plate 111. The guide sliders 271, 272, 273, 274 are used to move the ball rollers 281, 282, 283, the guide roller 284 and the coating gun 120. The ball rollers 281, 282, 283 and the guide roller 284 are used to smoothly move the gun bracket 200 along the wheel arch WAC. The swing shaft portion 290 is used for finely adjusting a posture of the gun bracket 200. The structures of these constitutional elements are described below.

Figure 4:
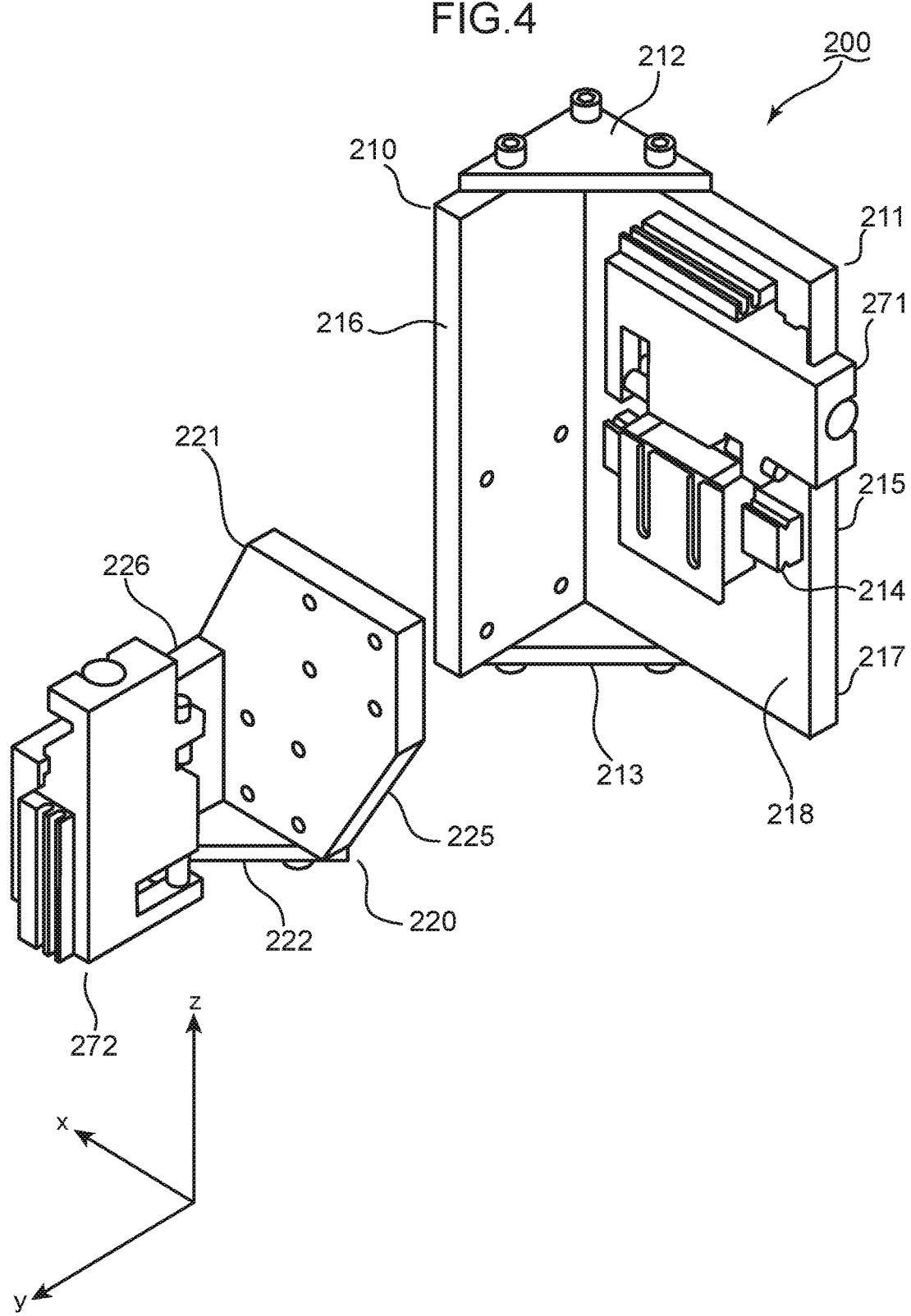
FIG. 4 is an exploded perspective view of a part of the gun bracket of the coating device shown in FIG. 1.

FIG. 4 is an exploded perspective view of a part of the gun bracket 200. The gun bracket 200 is described with reference to FIGS. 1, 3 and 4.

The bracket member 210 includes a bracket plate 211, two reinforcing plates 212, 213 and a linear guide 214. The bracket plate 211 is used for fixing the gun bracket 200 to the bracket plate 111 described with reference to FIG. 1. The reinforcing plates 212, 213 are fixed to the bracket plate 211 for reinforcing the gun bracket 200. The linear guide 214 is used for a displacement of the bracket member 220. The structures of these constitutional elements are described below.

The bracket plate 211 includes a plate portion 215 situated substantially in parallel to an imaginary plane which encompasses the x and z axes, and a plate portion 216 situated substantially in parallel to an imaginary plane which encompasses the y and z axes so that the bracket plate 211 has an L-shaped horizontal cross section. The reinforcing plate 212 is fixed to the upper edge surfaces of the plate portions 215, 216 whereas the reinforcing plate 213 is fixed to the lower edge surfaces of the plate portions 215, 216. The reinforcing plates 212, 213 enhance rigidity of the bracket plate 211. The plate portion 215 has a front surface 217 and a rear surface 218 opposite to the front surface 217. The guide slider 271 and the linear guide 214 are fixed to the rear surface 218. The linear guide 214 is situated below the guide slider 271. The plate portion 216 situated on the left of the guide slider 271 is bent from the left edge of the plate portion 215. The bracket plate 111 described with reference to FIG. 1 is fixed to the plate portion 216. With regard to the present embodiment, the fourth bracket member is exemplified by the bracket member 210.

The bracket member 220 includes a bracket plate 221 and a reinforcing plate 222. The bracket plate 221 is used for connecting the bracket member 220 to the bracket member 210. The reinforcing plate 222 is used for reinforcing the gun bracket 200. The structures of these constitutional elements are described below.

The bracket plate 221 includes a plate portion 225 situated substantially in parallel to the imaginary plane which encompasses the x and z axes, and a plate portion 226 situated substantially in parallel to the imaginary plane which encompasses the y and z axes. The reinforcing plate 222 is fixed to the lower edge surfaces of the plate portions 225, 226 to reinforce the bracket plate 221. The plate portion 225 is connected to the guide slider 271 and the linear guide 214. When the air is supplied to the guide slider 271, the guide slider 271 pushes out the bracket plate 221 rightward. Accordingly, the bracket member 220 moves in the extension direction of the x axis relative to the bracket member 210. The linear guide 214 guides a displacement of the bracket plate 221 in a direction along the x axis. The guide slider 272 is mounted on the plate portion 226 which is bent rearward from the left edge of the bracket plate 221. With regard to the present embodiment, the fifth bracket member is exemplified by the bracket member 220.

Figure 5:
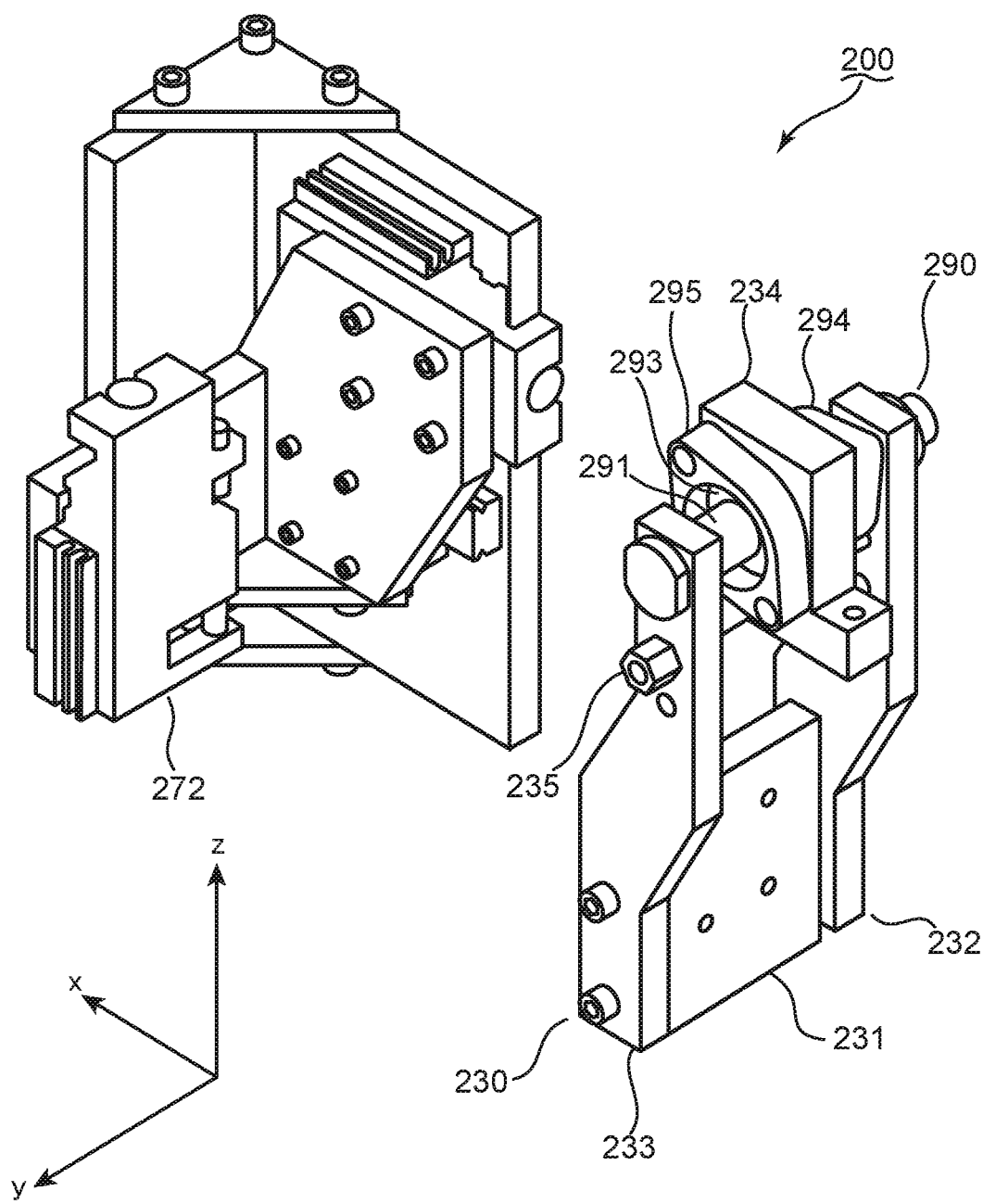
FIG. 5 is an exploded perspective view of a part of the gun bracket of the coating device shown in FIG. 1.

FIG. 5 is an exploded perspective view of a part of the gun bracket 200. The gun bracket 200 is further described with reference to FIGS. 1, 3 and 5.

The bracket member 230 includes a mounting plate 231, a front arm plate 232, a rear arm plate 233, an intermediate plate 234 and a connecting shaft 235. The front and rear arm plates 232, 233 are used for holding the swing shaft portion 290. The mounting plate 231 situated between the front and rear arm plates 232, 233 is used for mounting the bracket member 230 on the bracket member 220. The connecting shaft 235 which is connected to the front and rear win plates 232, 233 above the mounting plate 231 is used for determining a swing range of the gun bracket 200 around the swing shaft portion 290. The intermediate plate 234 mounted on the swing shaft portion 290 which extends above the connecting shaft 235 is used for connecting the bracket member 230 to the bracket member 240 (c.f. FIG. 1). The structures of these constitutional elements are described below.

The mounting plate 231 is a rectangular plate member which is situated substantially in parallel to the imaginary plane which encompasses the y and z axes. The mounting plate 231 is fixed to the guide slider 272. When the air is supplied to the guide slider 272, the guide slider 272 pushes out the bracket member 230 upward. In short, the bracket member 230 moves in the extension direction of the z axis relative to the bracket member 220. The front arm plate 232 is fixed to the front edge surface of the mounting plate 231 connected to the guide slider 272 which pushes out the bracket member 230 upward. The front arm plate 232 extends upward from the upper edge surface of the mounting plate 231. The rear arm plate 233 situated behind the front arm plate 232 is fixed to the rear edge surface of the mounting plate 231, and extends upward from the upper edge surface of the mounting plate 231. The intermediate plate 234 is situated between the rear and front arm plates 233, 232 and is positioned above the mounting plate 231.

Figure 6:
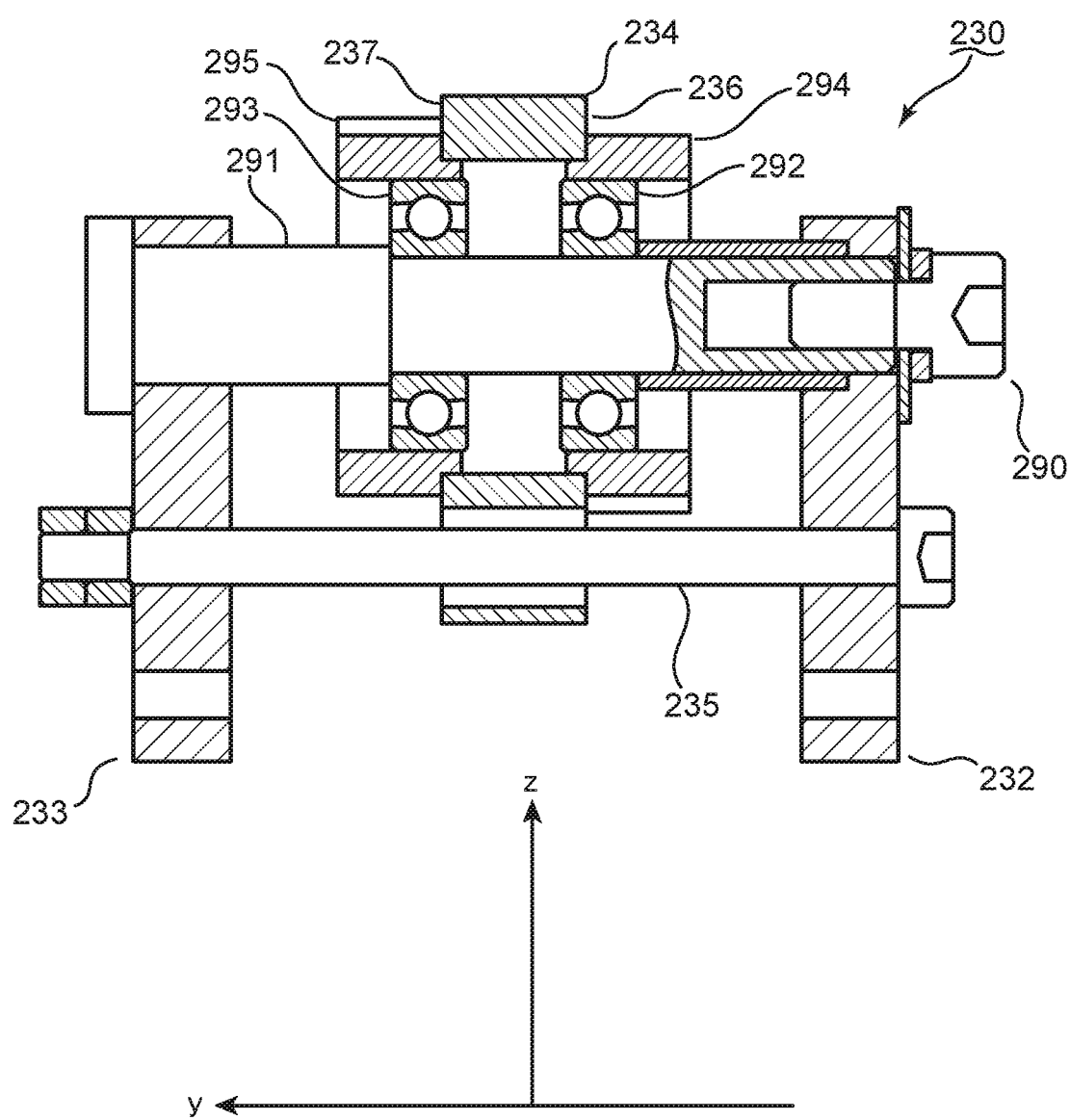
FIG. 6 is a schematic longitudinal cross-sectional view of a part of a bracket member of the gun bracket shown in FIG. 5.

FIG. 6 is a schematic longitudinal cross-sectional view of a part of the bracket member 230. The gun bracket 200 is further described with reference to FIGS. 5 and 6.

As shown in FIGS. 5 and 6, the connecting shaft 235 situated between the intermediate plate 234 and the mounting plate 231 extends substantially in parallel to the y axis, and extends through the front arm plate 232, the intermediate plate 234 and the rear arm plate 233. The intermediate plate 234 has a front surface 236 and a rear surface 237 opposite to the front surface 236. The front surface 236 of the intermediate plate 234 faces the front arm plate 232. The rear surface 237 of the intermediate plate 234 faces the rear arm plate 233.

The swing shaft portion 290 on which the intermediate plate 234 is mounted includes a shaft portion 291, two bearings 292, 293 and two bearing holders 294, 295. As shown in FIG. 6, the shaft portion 291 extends substantially in parallel to the y axis above the connecting shaft 235, and extends through the front arm plate 232, the intermediate plate 234 and the rear arm plate 233. Accordingly, the swing shaft portion 290 is held by the bracket member 230. The bearing holder 294 of the swing shaft portion 290 is fixed to the front surface 236 of the intermediate plate 234. A part of the bearing holder 294 is fitted in a circular opening which is formed in the intermediate plate 234 around the shaft portion 291. The remaining portion of the bearing holder 294 protrudes from the front surface 236 of the intermediate plate 234 toward the front arm plate 232. The bearing 292 is fitted in the annular gap formed between the shaft portion 291 and the bearing holder 294. The bearing holder 295 situated behind the bearing holder 294 is fixed to the rear surface 237 of the intermediate plate 234. A part of the bearing holder 295 is fitted in a circular opening which is formed in the intermediate plate 234 around the shaft portion 291. The remaining portion of the bearing holder 295 protrudes from the rear surface 237 of the intermediate plate 234 toward the rear arm plate 233. The bearing 293 is fitted in the annular gap formed between the shaft portion 291 and the bearing holder 295. With regard to the present embodiment, the sixth bracket member is exemplified by the bracket member 230.

The axes of rotation of the bearings 292, 293 are substantially coincident to the center axis of the shaft portion 291. A through hole which is formed in the intermediate plate 234 so as to allow the penetration of the connecting shaft 235 below the shaft portion 291 has a diameter larger than the outer diameter of the connecting shaft 235. The intermediate plate 234 may be angularly displaced around the shaft portion 291 by an amount in correspondence to the difference between the diameter of the through hole and the outer diameter of the connecting shaft 235.

Figure 7:
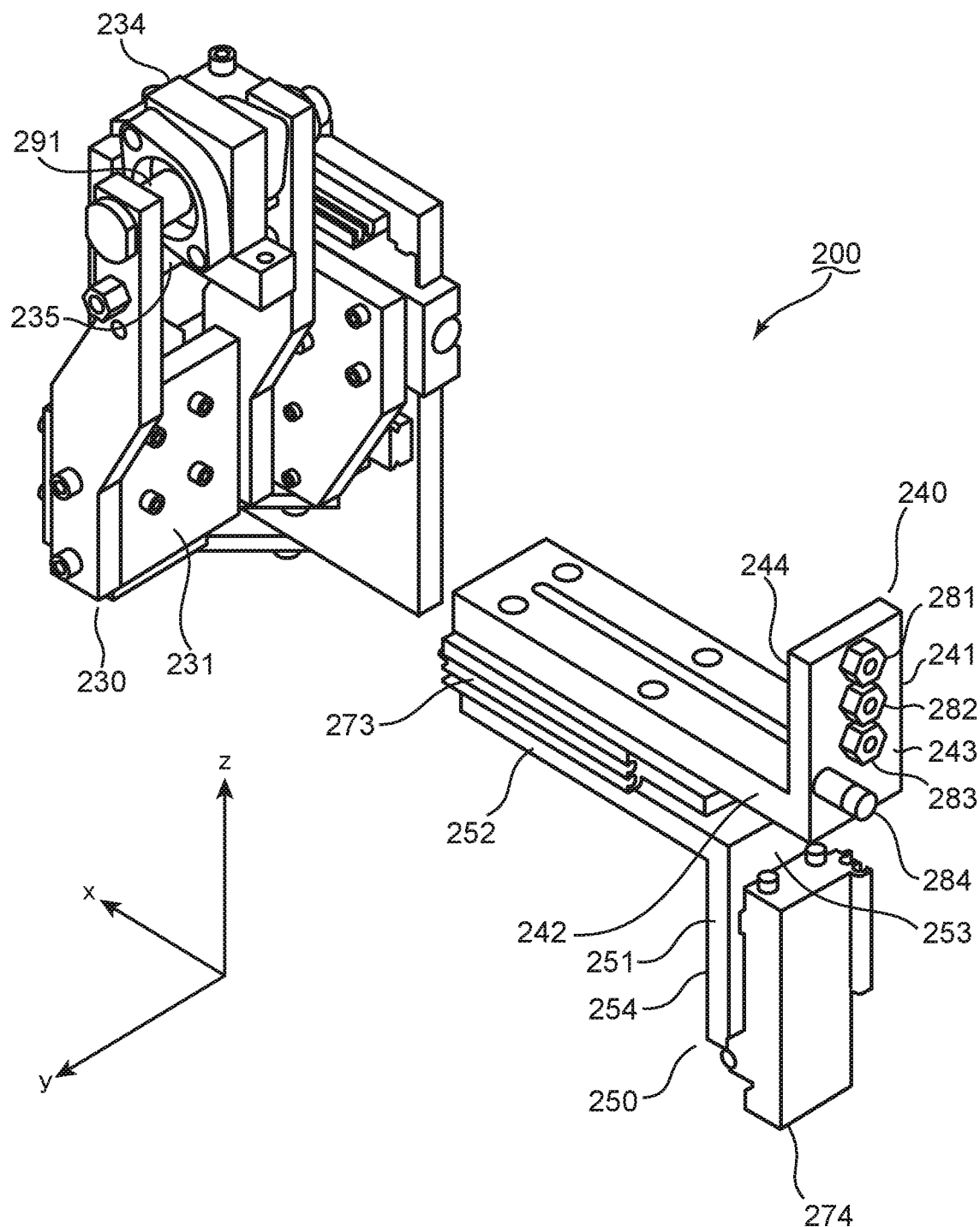
FIG. 7 is an exploded perspective view of a part of the gun bracket of the coating device shown in FIG. 1.

FIG. 7 is an exploded perspective view of a part of the gun bracket 200. The gun bracket 200 is further described with reference to FIGS. 1, 3 and 7.

The bracket member 240 includes a plate portion 241 situated substantially in parallel to the imaginary plane which encompasses the y and z axes, and a plate portion 242 situated substantially in parallel to the imaginary plane which encompasses the x and y axes. The plate portion 242 is bent leftward from the lower end of the plate portion 241.

The plate portion 241 has a right surface 243 and a left surface 244 opposite to the right surface 243. The three ball rollers 281, 282, 283 and the guide roller 284 are fixed to the right surface 243. The three ball rollers 281, 282, 283 are aligned in the vertical direction (i.e. in the extension direction of the z axis) on the right surface 243. The ball roller 281 is situated at the uppermost position among the three ball rollers 281, 282, 283. The ball roller 283 is situated at the lowermost position among the three ball rollers 281, 282, 283. The ball roller 282 is positioned between the ball rollers 281, 283. The guide roller 284 is positioned behind the row of the ball rollers 281, 282, 283 and below the ball roller 283. With regard to the present embodiment, the first bracket member is exemplified by the bracket member 240.

The bracket member 250 situated below the bracket member 240 on which the guide roller 284 and the ball rollers 281, 282, 283 are mounted includes a plate portion 251 situated substantially in parallel to the imaginary plane which encompasses the y and z axes, and a plate portion 252 situated substantially in parallel to the imaginary plane which encompasses the x and y axes. The plate portion 251 of the bracket member 250 is connected to the mounting plate 231 of the bracket member 230.

The plate portion 252 which is bent leftward from the upper end of the plate portion 251 of the bracket member 250 is positioned below the plate portion 242 of the bracket member 240. The guide slider 273 is situated between the plate portions 242, 252. The guide slider 273 is connected to the plate portions 242, 252 of the bracket members 240, 250. When the air is supplied to the guide slider 273, the guide slider 273 moves the plate portion 252 leftward.

The guide slider 273 and the plate portions 242, 252 of the bracket members 240, 250 are inserted into a space formed between the connecting shaft 235 and the upper edge of the mounting plate 231. The plate portion 242 of the bracket member 240 is connected to the intermediate plate 234. Accordingly, the bracket members 240, 250 and the guide slider 273 may be angularly displaced around the shaft portion 291 together with the intermediate plate 234.

The plate portion 252 of the bracket member 250 has a right surface 253 and a left surface 254 opposite to the right surface 253. The left surface 254 faces the mounting plate 231. The guide slider 274 is mounted on the right surface 253.

The bracket member 260 is mounted on the guide slider 274 (c.f FIG. 1). Accordingly, the guide slider 274 is situated between the bracket members 250, 260.

The bracket member 260 includes a plate portion 261 situated substantially in parallel to the imaginary plane which encompasses the y and z axes, and a plate portion 262 situated substantially in parallel to the imaginary plane which encompasses the x and z axes. The plate portion 261 is mounted on the guide slider 274. The plate portion 262 extends rightward from the plate portion 261. The coating gun 120 is fixed to the plate portion 262.

The coating gun 120 includes a vessel 310 and a nozzle head 320. The vessel 310 is fixed to the plate portion 262 of the bracket member 260. The nozzle head 320 is a cylindrical member which extends upward from the vessel 310. A mechanism for discharging the coating agent such as a sealing agent and a paint from a discharge port (not shown) formed in the nozzle head 320 is stored mainly in the vessel 310. Mechanisms of known discharge devices for discharging a liquid may be applied to the coating gun 120. Accordingly, the principles of the present embodiment are not limited to a particular device used as the coating gun 120.

Figure 8:
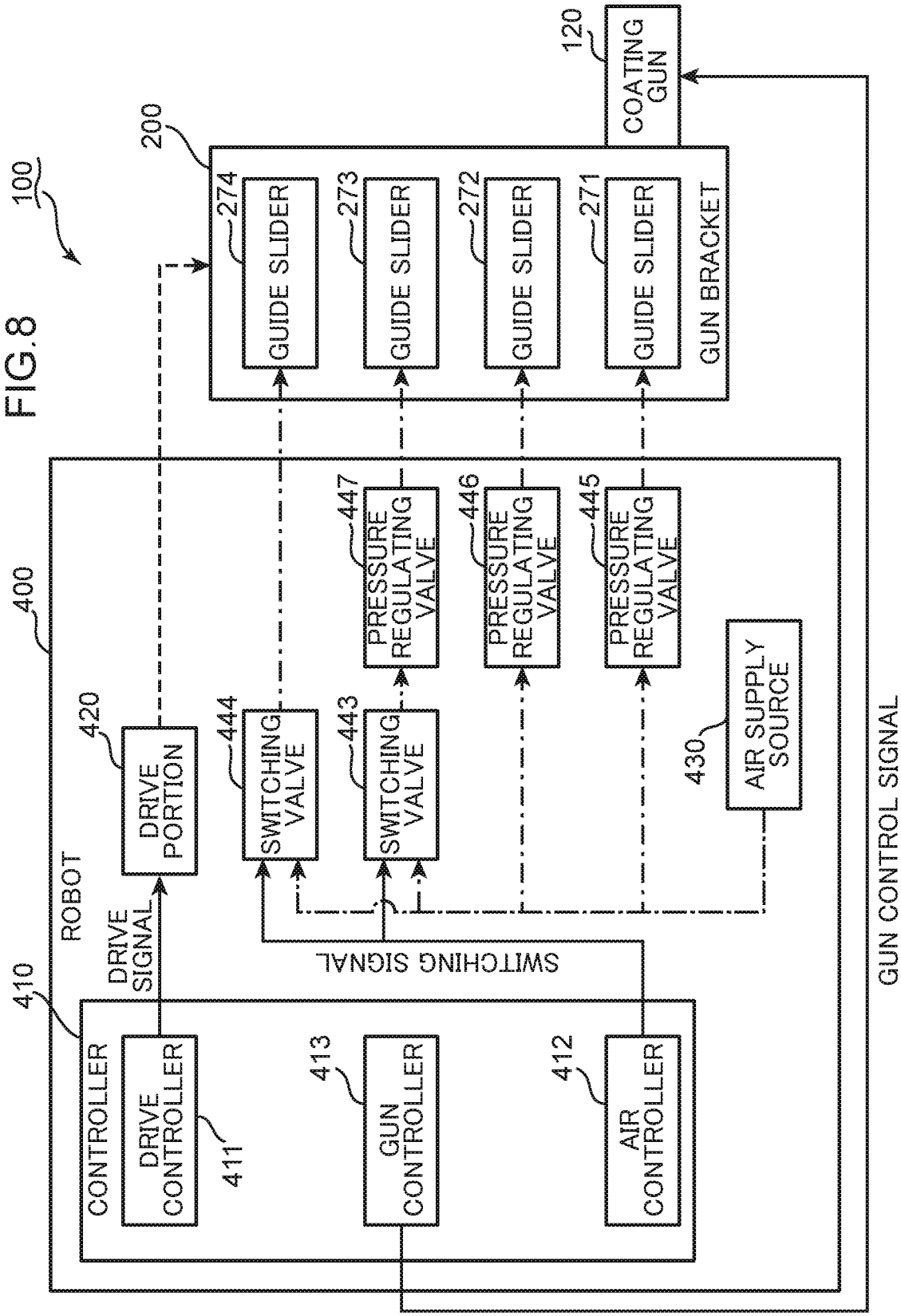
FIG. 8 is a schematic block diagram of the coating device shown in FIG. 1.

FIG. 8 is a schematic block diagram of the coating device 100. The coating device 100 is further described with reference to FIGS. 1, 3 and 8.

The solid line shown in FIG. 8 indicates a signal transmission path. The dotted line shown in FIG. 8 indicates a force transmission path. The chain line shown in FIG. 8 indicates an air transmission path.

The robot 400 includes a controller 410, a drive portion 420, an air supply source 430, two switching valves 443, 444 and three pressure regulating valves 445, 446, 447. The drive portion 420, the air supply source 430 and the switching valves 443, 444 are operated under a control of the controller 410. The drive portion 420 displaces the gun bracket 200. The air to be supplied to the gun bracket 200 is fed from the air supply source 420. The air supply path to the gun bracket 200 is controlled by using the switching valves 443, 444. A pressure of the air supplied to the gun bracket 200 is regulated by using the pressure regulating valves 445, 446, 447.

The controller 410 includes a drive controller 411, an air controller 412 and a gun controller 413. The drive controller 411 controls the drive portion 420. The air controller 412 controls the switching valves 443, 444. The gun controller 413 controls the coating gun 120. These constitutional elements are described below.

The drive controller 411 generates a drive signal. The drive signal is outputted from the drive controller 411 to the drive portion 420. The drive portion 420 may be formed of motors (not shown) which are operated in response to the drive signals. The drive portion 420 moves the bracket 110 in the extension direction of the x, y and/or z axes in response to the drive signals. In addition, the drive portion 420 causes a rotational movement of the bracket 110 about the x axis in response to the drive signal. When the drive portion 420 drives the bracket 110, the air supply source 430 feeds the air to the guide sliders 271, 272 and the switching valves 443, 444. The air is supplied from the air supply source 430 to the guide slider 271 through the pressure regulating valve 445, so that the guide slider 271 pushes out the bracket member 220 rightward with a predetermined force. The air is supplied to the guide slider 272 through the pressure regulating valve 446, so that the guide slider 272 pushes out the bracket member 230 upward with a predetermined force. The remaining guide sliders 273, 274 receive the supplied air through the switching valves 443, 444. The air controller 412 which controls the switching valves 443, 444 generates switching signals. The switching signals are outputted from the air controller 412 to the switching valves 443, 444. The switching valve 443 opens or closes the air transmission path to the guide slider 273 in response to the switching signal. When the air transmission path from the switching valve 443 to the guide slider 273 is opened, the air is supplied to the guide slider 273 through the pressure regulating valve 447, so that the guide slider 273 moves the bracket member 250 leftward with a predetermined force. Unlike the guide slider 273 which moves the bracket member 250 leftward, the guide slider 274 moves the bracket member 260 in the extension direction of the z axis. The switching valve 444 which corresponds to the guide slider 274 opens or closes the air transmission path to the guide slider 274 in response to the switching signal. When the air transmission path from the switching valve 444 to the guide slider 274 is opened, the bracket member 260 and the coating gun 120 may be displaced in the extension direction of the z axis.

The gun controller 413 which controls the coating gun 120 generates a gun control signal. The gun control signal is outputted from the gun controller 413 to the coating gun 120. The coating gun 120 discharges the sealing agent in response to the gun control signal.

Figure 9:
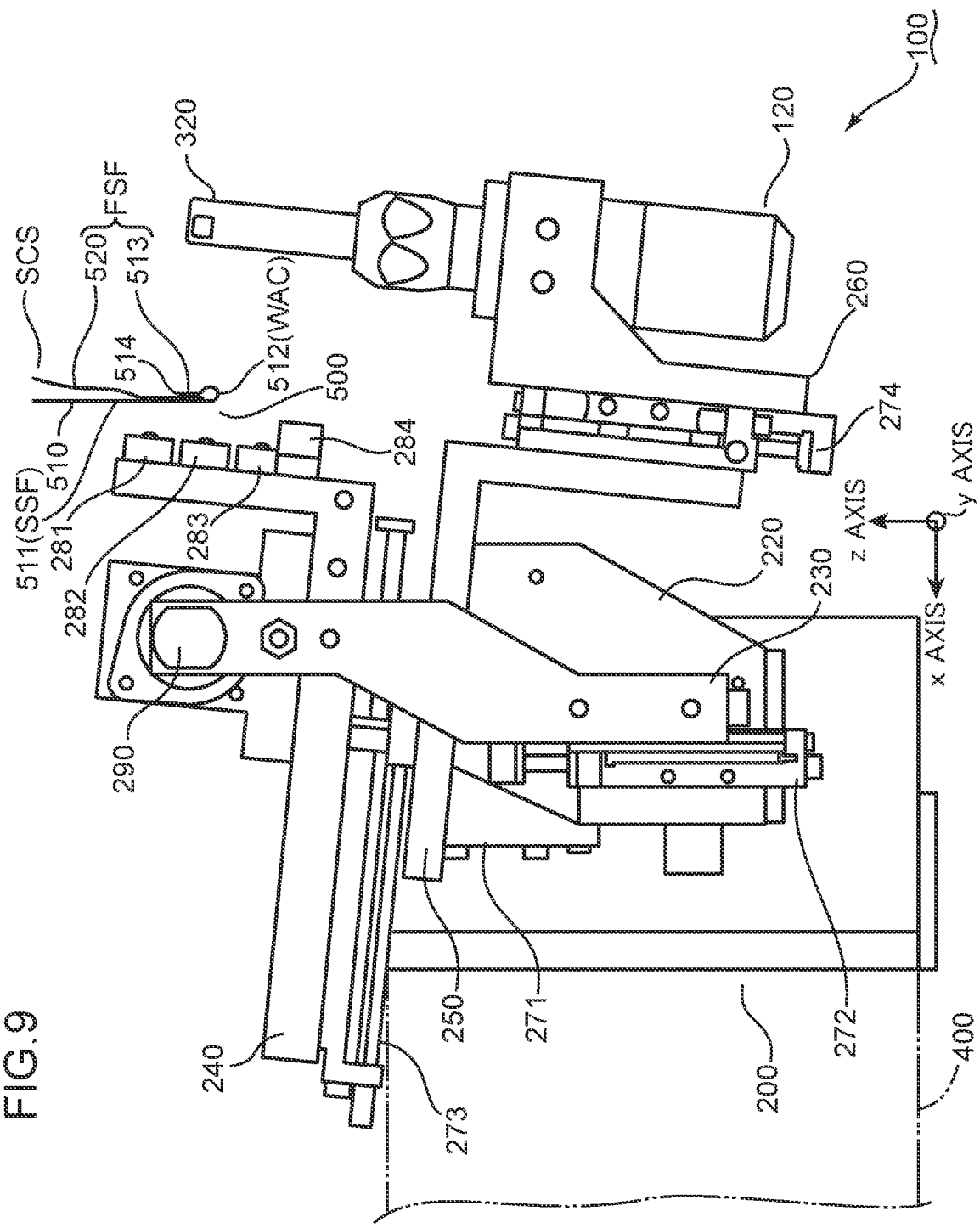
FIG. 9 is a schematic side view of the coating device shown in FIG. 1.

FIG. 9 is a schematic side view of the coating device 100. The coating device 100 is further described with reference to FIGS. 8 and 9.

FIG. 9 shows a hem portion 500 which forms the wheel arch WAC on the rear portion of the vehicle body SCS, and the coating device 100 which is at the first rotational position as the initial position. The hem portion 500 is situated between the bracket member 240 and the nozzle head 320. The sealing agent is discharged and/or applied from the coating device 100 to the hem portion 500 for the rust prevention to the hem portion 500.

The hem portion 500 includes an outer panel 510 and an inner panel 520. The outer panel 510 includes a main plate portion 511 which forms the second surface SSF, and a hem strip 513 which is bent along a bent edge 512 to form at least a part of the wheel arch WAC. The hem strip 513 includes a hem edge 514 which extends along the wheel arch WAC at a position distant from the bent edge 512. The lower end portion of the inner panel 520 is situated between the hem strip 513 and the main plate portion 511. The hem strip 513 and the inner panel 520 forms the first surface FSF opposite to the second surface SSF. The sealing agent is discharged from the nozzle head 320 toward the hem edge 514.

FIGS. 10A to 10G are schematic side views of the coating device 100. Operations of the coating device 100 are described with reference to FIGS. 8 to 10G.

At the initial position shown in FIG. 9, the air supply source 430 feeds the air to the guide sliders 271, 272 through the pressure regulating valve 445 (c.f FIG. 8). Accordingly, the guide slider 271 pushes out the bracket member 220 rightward with a predetermined force whereas the guide slider 272 pushes out the bracket member 230 upward with a predetermined force. The guide sliders 272, 273, 274, the bracket members 230, 240, 250, 260, the ball rollers 281, 282, 283, the guide roller 284 and the coating gun 120 are mounted on the bracket member 220, so that these constitutional members are pushed out rightward together with the bracket member 220. The guide sliders 273, 274, the bracket members 240, 250, 260, the ball rollers 281, 282, 283, the guide roller 284 and the coating gun 120 are mounted on the bracket member 230, so that these constitutional members are pushed out upward together with the bracket member 230.

Figure 10A:
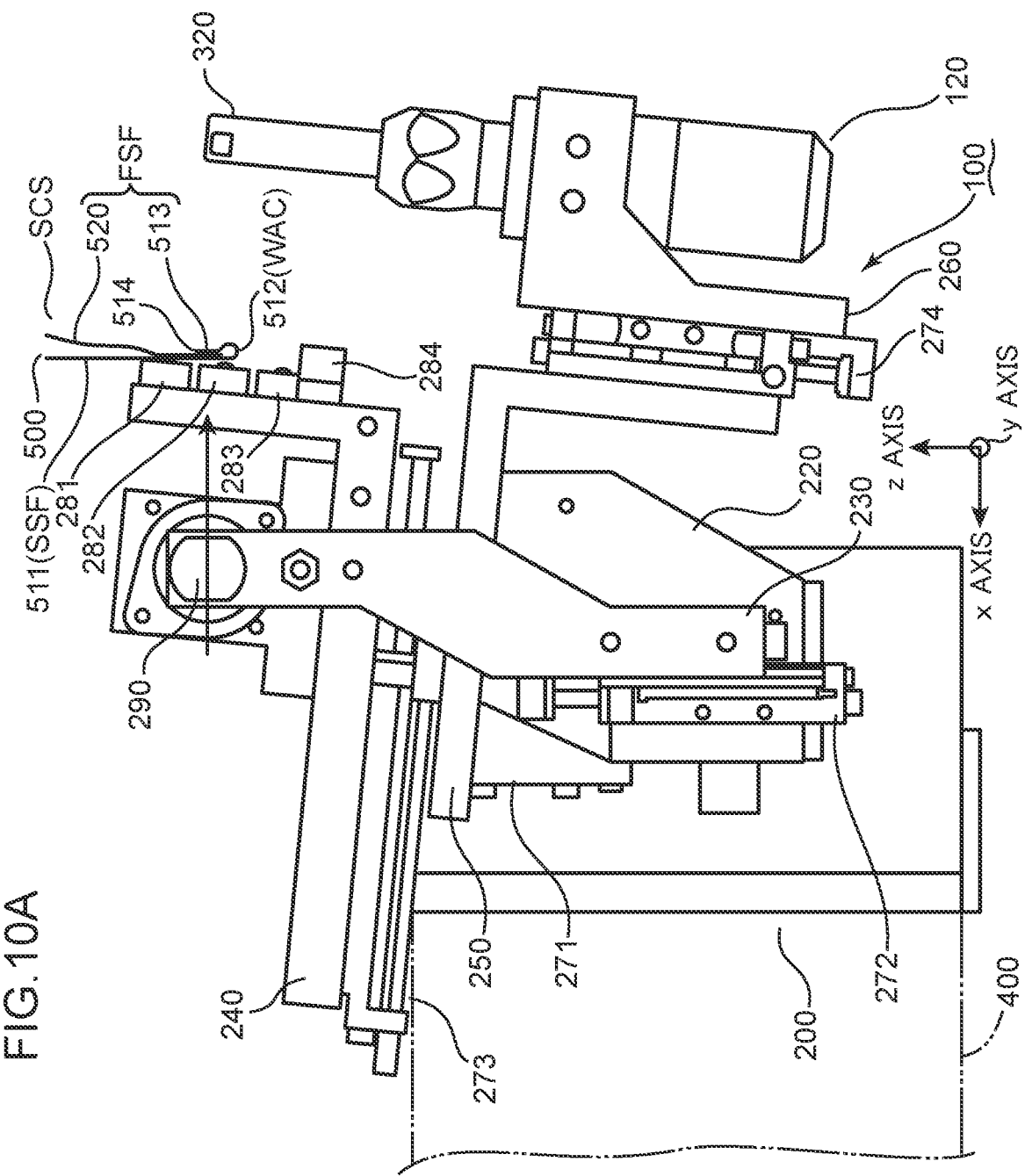
FIG. 10A is a schematic side view of the coating device shown in FIG. 1.

Then, the drive controller 411 generates a drive signal (c.f. FIG. 8). The drive signal is outputted from the drive controller 411 to the drive portion 420. The drive portion 420 moves the gun bracket 200 rightward in response to the drive signal (c.f. FIG. 10A). Accordingly, the ball roller 281 mounted on the bracket member 240 of the gun bracket 200 is brought into contact with the main plate portion 511.

When the drive portion 420 further moves the gun bracket 200 rightward after the ball roller 281 is brought into contact with the main plate portion 511, the bracket member 240 is angularly displaced around the swing shaft portion 290 (i.e. the third axis extending in parallel to the y axis) (c.f. FIG. 10B). Accordingly, not only the ball roller 281 but also the ball roller 282 is brought into contact with the main plate portion 511.

Figure 10C:
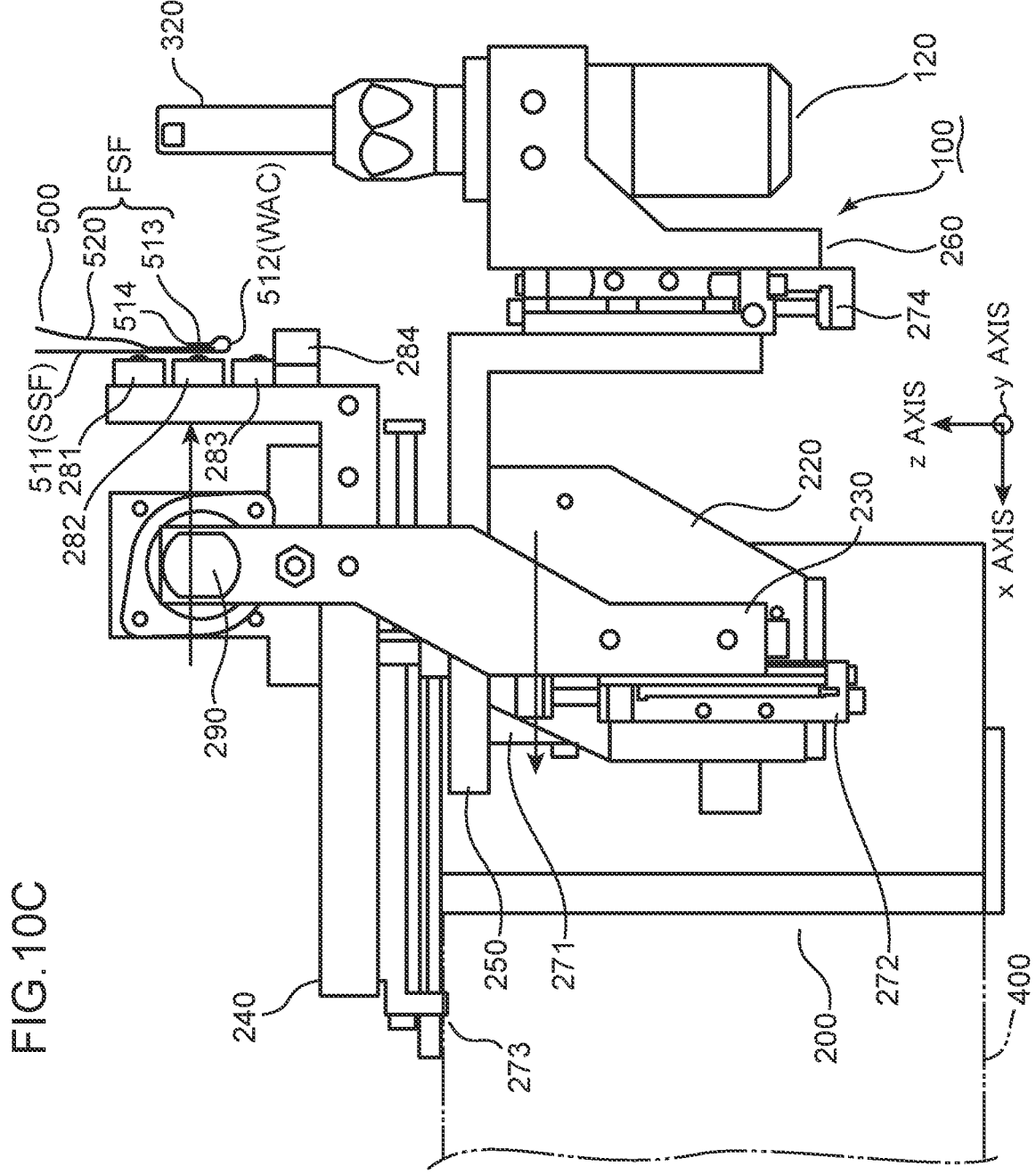
FIG. 10C is a schematic side view of the coating device shown in FIG. 1.

The drive portion 420 further moves the gun bracket 200 rightward after the ball roller 282 is brought into contact with the main plate portion 511 (c.f FIG. 10C). In this case, the guide slider 271 which has received the supplied air functions as a cushion. Accordingly, the robot 400 (c.f. FIG. 8) may strongly bring the ball rollers 281, 282 into pressure contact with the main plate portion 511 without damaging the main plate portion 511. At least one of the ball rollers 281, 282, 283 is continuously brought into pressure contact with the main plate portion 511 due to the cushion action of the guide slider 271 with the drive portion 420 moving the gun bracket 200 along the wheel arch WAC. In short, the gun bracket 200 may be finely displaced in the extension direction of the x axis in accordance with a surface shape of the main plate portion 511 (i.e. a concavo-convex shape of the second surface SSF). With regard to the present embodiment, the first press slider is exemplified by the guide slider 271.

After the ball rollers 281, 282 are strongly brought into contact with the main plate portion 511, the drive portion 420 moves the gun bracket 200 upward. Accordingly, the circumferential surface of the guide roller 284 fixed to the bracket member 240 of the gun bracket 200 is brought into contact with the bent edge 512 (c.f. FIG. 10D). When the guide roller 284 is brought into contact with the bent edge 512, the ball rollers 281, 282, 283 are brought into point contact with the surface of the main plate portion 511. While the gun bracket 200 is moved upward so as to bring the guide roller 284 into contact with the bent line 512, balls of the ball rollers 281, 282, 283 roll on the surface of the main plate portion 511 (i.e. the second surface SSF). With regard to the present embodiment, the first contact portion is exemplified by the ball rollers 281, 282, 283. The second contact portion is exemplified by the guide roller 284.

After the guide roller 284 is brought into contact with the bent edge 512, the drive portion 420 further moves the gun bracket 200 upward (c.f FIG. 10E). In this case, the guide slider 272 which has received the supplied air functions as a cushion. Accordingly, the robot 400 (c.f FIG. 8) may strongly bring the guide roller 284 into pressure contact with the bent edge 512 without damaging the bent edge 512.

While the drive portion 420 moves the gun bracket 200 along the wheel arch WAC, the guide roller 284 rotates about the second axis of rotation which is in parallel to the x axis with being continuously brought into pressure contact with the bent edge 512 due to the cushion action of the guide slider 272. In short, the gun bracket 200 may be finely displaced in accordance with the shape of the bent edge 512. With regard to the present embodiment, the second press slider is exemplified by the guide slider 272.

Figure 10F:
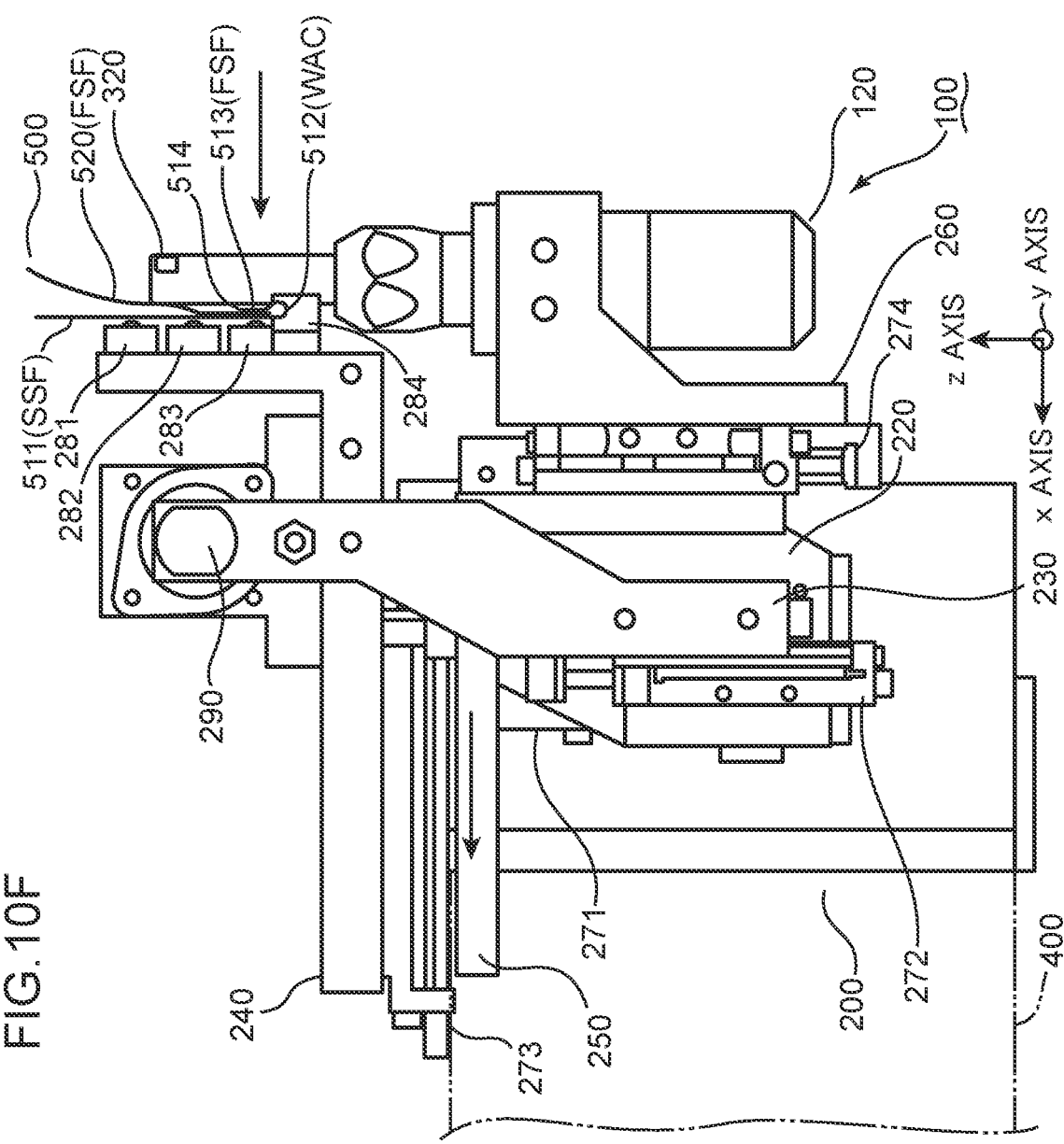
FIG. 10F is a schematic side view of the coating device shown in FIG. 1.

After the drive portion 420 moves the gun bracket 200 upward, a switching signal is outputted from the air controller 412 to the switching valve 443 (c.f. FIG. 8). When the switching valve 443 is opened in response to the switching signals, the air is supplied to the guide slider 273 through the pressure regulating valve 447. Accordingly, the guide slider 273 moves the bracket member 250 connected to the guide slider 273 leftward with a predetermined force (c.f. FIG. 10F). The coating gun 120 is connected to the bracket member 250 by way of the guide slider 274 and the bracket member 260. Accordingly, the nozzle head 320 of the coating gun 120 may move leftward together with the bracket member 250. As a result of the leftward movement of the bracket members 250, 260 and the guide slider 274 relative to the bracket member 240, the nozzle head 320 may approach the hem strip 513. With regard to the present embodiment, the first displacement slider is exemplified by the guide slider 273. The holding bracket portion is exemplified by the bracket members 250, 260. The second bracket member is exemplified by the bracket member 250. The third bracket member is exemplified by the bracket member 260.

Then, the robot 400 moves the gun bracket 200 along the wheel arch WAC. Meanwhile, the guide slider 271 brings the ball rollers 281, 282, 283 into pressure contact with the main plate portion 511. Accordingly, the nozzle head 320 may be finely displaced in the extension direction of the x axis in accordance with the surface shape of the main plate portion 511. In short, in cooperation with the guide slider 273, the guide slider 271 plays a role of allowing the displacement of the coating gun 120 in the extension direction of the first axis which is in parallel to the x axis. With regard to the present embodiment, the first slider mechanism is exemplified by the guide sliders 271, 273.

Figure 10G:
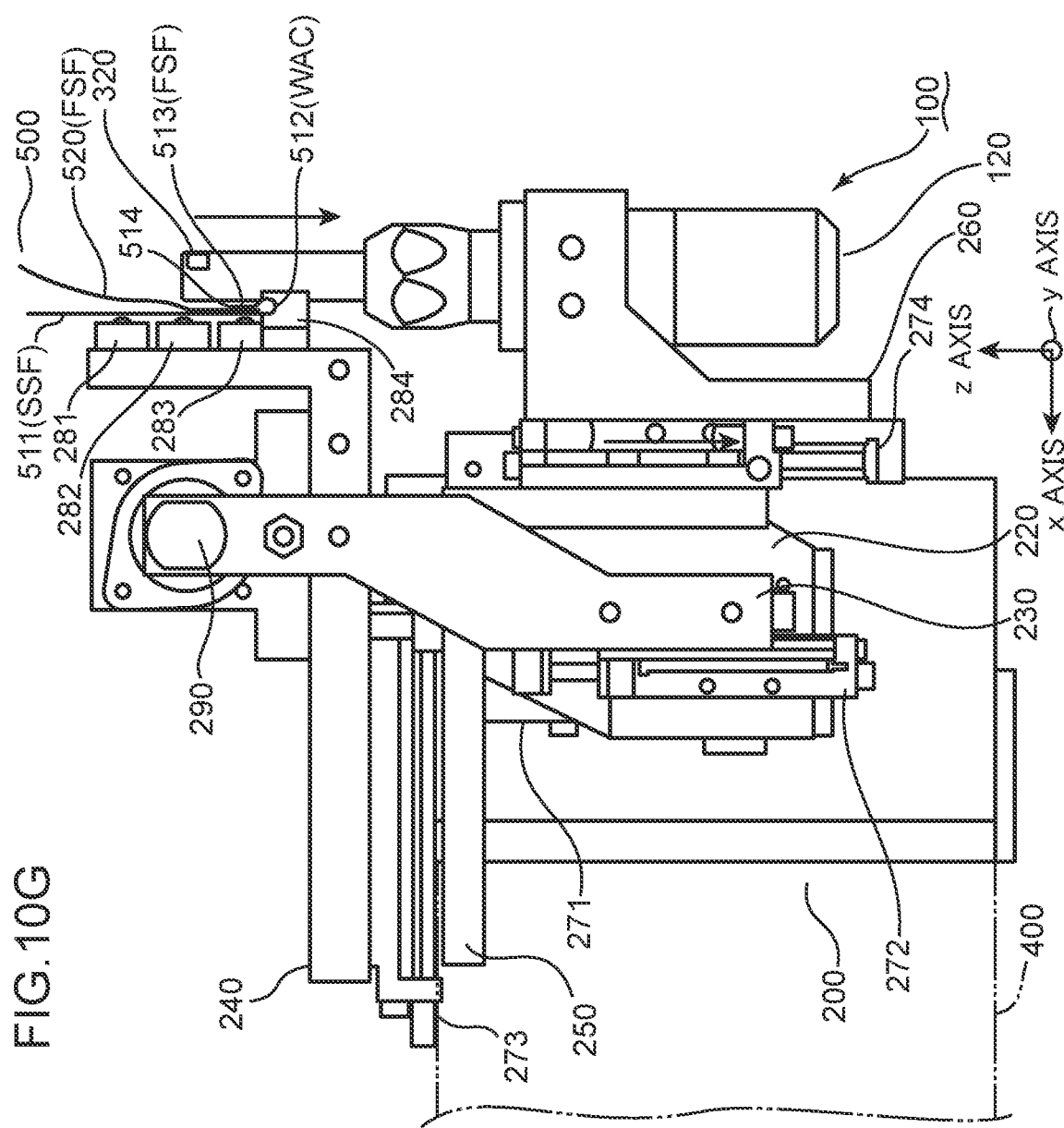
FIG. 10G is a schematic side view of the coating device shown in FIG. 1.

When the discharge port (not shown) formed in the nozzle head 320 of the coating gun 120 is distant from the hem edge 514 in the extension direction of the z axis, a switching signal is outputted from the air controller 412 to the switching valve 444. Accordingly, the guide slider 274 moves the bracket member 260 and the coating gun 120 in the extension direction of the z axis relative to the bracket member 250 so that the discharge port of the nozzle head 320 is allowed to face the hem edge 514. Accordingly, the coating position of the sealing agent is set on the hem edge 514 (c.f. FIG. 10G). With regard to the present embodiment, the second displacement slider is exemplified by the guide slider 274.

When the coating position of the sealing agent is set on the hem edge 514, the drive portion 420 moves the gun bracket 200 along the wheel arch WAC. Meanwhile, the gun controller 413 generates a gun control signal. The gun control signal is outputted from the gun controller 413 to the coating gun 120. The coating gun 120 discharges the sealing agent toward the coating position in response to the gun control signal. Accordingly, a layer of the sealing agent is formed on the hem edge 514.

While the robot 400 moves the gun bracket 200 along the wheel arch WAC so as to form a layer of the sealing agent along the hem edge 514, the guide slider 272 brings the guide roller 284 into pressure contact with the bent edge 512, so that the nozzle head 320 may be finely displaced in the extension direction of the z axis in accordance with the shape of the bent edge 512. Accordingly, in cooperation with the guide slider 274, the guide slider 272 plays a role of allowing the displacement of the coating gun 120 in the extension direction of the second axis which is in parallel to the z axis. With regard to the present embodiment, the second slider mechanism is exemplified by the guide sliders 272, 274.

As described above, the guide sliders 271, 273 bring the ball rollers 281, 282, 283 and the guide roller 284 into pressure contact with the main plate portion 511 and the bent edge 512 respectively. Accordingly, even when a movement trajectory of the gun bracket 200 determined by the robot 400 is slightly different from the shape of the hem portion 500, an appropriate positional relationship between the coating gun 120 and the hem portion 500 may be maintained. In short, it is acceptable that there is a slight difference between the movement trajectory of the gun bracket 200 determined by the robot 400 and the shape of the hem portion 500. Accordingly, a teaching operation for making the robot 400 memorize the movement trajectory of the gun bracket 200 does not require excessive accuracy.

<Second Embodiment>

The sensor device which is described in the context of the first embodiment may output voltage signals indicating a thickness (i.e. a coating thickness) and a width (i.e. a coating width) of the sealing agent. The robot may have a determination function of comparing the detected coating thickness and the detected coating width with predetermined threshold values to determine whether or not the sealing agent has been appropriately applied. An exemplary coating device provided with a robot having the determination function is described in the second embodiment.

Figure 11:
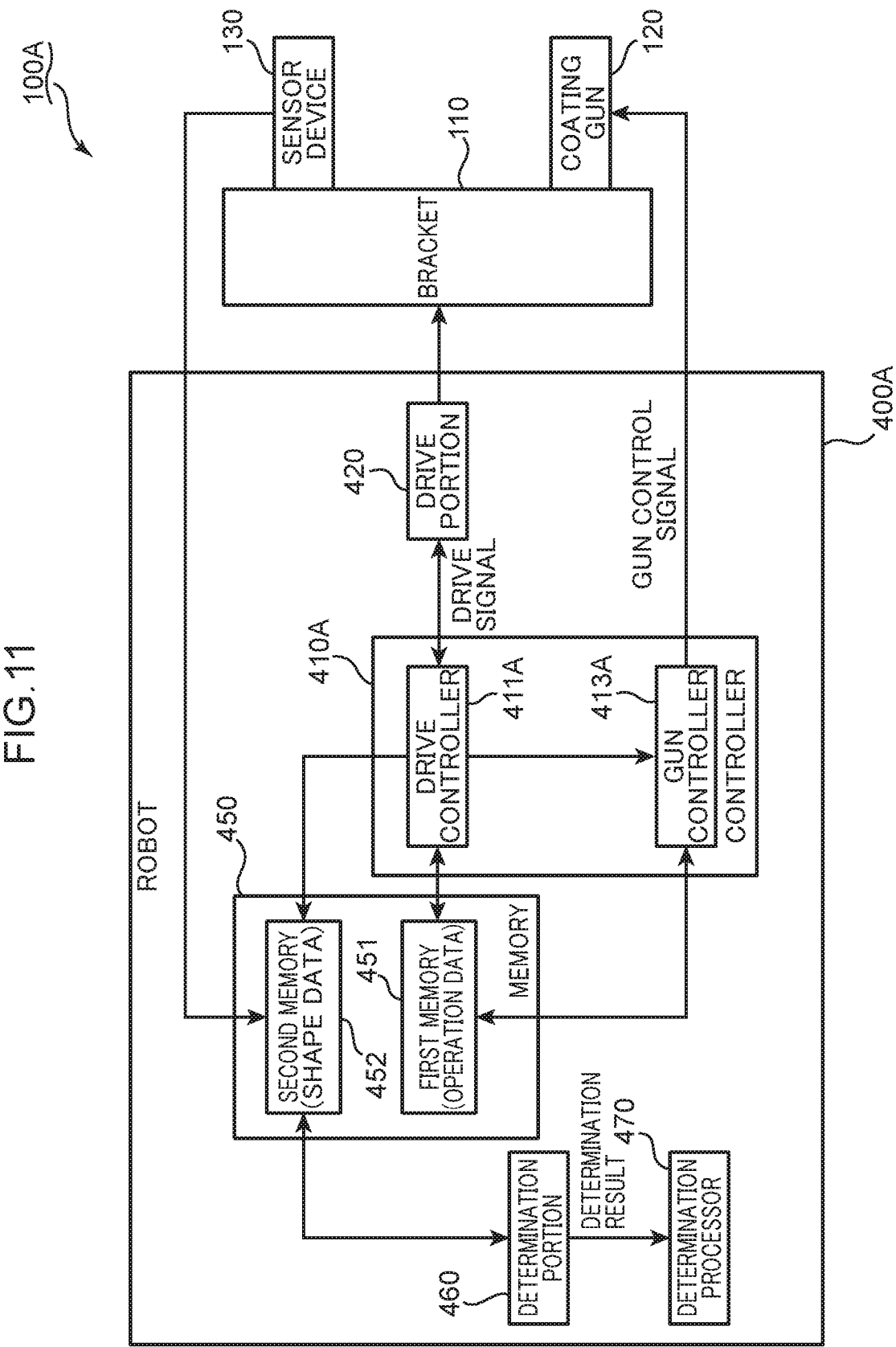
FIG. 11 is a conceptual block diagram of a coating device according to the second embodiment.

FIG. 11 is a conceptual block diagram of a coating device 100A according to the second embodiment. The coating device 100A is described with reference to FIGS. 1, 2B, 8, 10G and 11. The description of the first embodiment is applicable to constitutional elements to which the same symbols are given as the first embodiment.

Like the first embodiment, the coating device 100A includes the bracket 110, the coating gun 120 and the sensor device 130. The description of the first embodiment is applicable to these elements.

The coating device 100A further includes a robot 400A. Like the first embodiment, the robot 400A includes the drive portion 420. The description of the first embodiment is applicable to the drive portion 420.

The robot 400A further includes a controller 410A, a memory 450, a determination portion 460 and a determination processor 470. The controller 410A controls the drive portion 420 and the coating gun 120. The memory 450 stores various data used for a control performed by the controller 410A. The determination portion 460 performs determination processes about a shape of a layer of the sealing agent applied from the coating gun 120. The determination processor 470 performs predetermined processes in response to the determination processing result.

The memory 450 includes a first memory 451 and a second memory 452. In the first memory 451, positional information indicating a movement trajectory of the intersecting point of the x, y and z axes described in the context of FIG. 2A (i.e. a connecting portion between the robot 400A and the bracket plate 111) is stored as the operation data. The positional information may be generated by a general teaching process applied to the robot 400A. As described in the context of the first embodiment, the structure of the bracket 110 does not require an excessively accurate teaching process, so that the positional information may be easily generated. Unlike the first memory 451 which stores the positional information, the second memory 452 stores shape data about a shape of a layer of the sealing agent.

The controller 410A controls the drive portion 420 and the coating gun 120 on the basis of the operation data stored in the memory 450. The controller 410A includes a drive controller 411A and a gun controller 413A. The drive controller 411A controls the drive portion 420. The gun controller 413A controls the coating gun 120.

The drive controller 411A reads out the operation data from the first memory 451. The drive controller 411A generates a drive signal in response to the read-out operation data. The drive signal is outputted from the drive controller 411A to the drive portion 420. The drive portion 420 moves or rotates the bracket 110 in response to the drive signal. When the drive portion 420 moves the bracket 110 set at the first rotational position (c.f. FIG. 2A) on the imaginary plane which encompasses the y and z axes in accordance with the operation data, the coating position described in the context of the first embodiment may be moved along the hem edge 514 (c.f FIG. 10G).

The operation data read out by the drive controller 411A contains coating amount information indicating a coating amount of the sealing agent. The coating amount information may be associated with the aforementioned positional information. When the bracket 110 is set at the first rotational position, the drive controller 411A outputs the positional information to the gun controller 413A. The coating amount information in correspondence to the positional information received from the drive controller 411A is read out by the gun controller 413A from the first memory 451. The gun controller 413A generates a gun control signal in response to the read-out coating amount information. The gun control signal is outputted from the gun controller 413A to the coating gun 120. The coating gun 120 operates in response to the gun control signal. Accordingly, the sealing agent of the coating amount set by the gun control signal is discharged to a coating position on the hem edge 514.

When the set position of the bracket 110 is changed from the first rotational position at which the sealing agent is discharged to a coating position on the hem edge 514 to the second rotational position at which a shape detection is performed by using the sensor device 130, the positional information is outputted from the drive controller 411A to the second memory 452. Then, the bracket 110 is moved along the wheel arch WAC (c.f. FIG. 2B) by the drive portion 420. Meanwhile, the second memory 452 receives the positional information from the drive controller 411A and a voltage signal (i.e. shape data of the coated sealing agent) from the sensor device 130. The shape data is stored in the second memory 452 with being associated with the positional information. Processes using the shape data are described below.

As described above, the robot 400A applies the sealing agent using the coating gun 120, and detects the shape of the coated sealing agent using the sensor device 130. The detected shape is stored in the second memory 452 as the shape data. After completion of these processes, the determination portion 460 reads out the shape data from the second memory 452. The determination portion 460 may be configured to extract the shape data associated with the positional information indicating positions in correspondence to predetermined sampling points.

In order to generate shape data, the first and second optical sensors 131, 132 of the sensor device 130 are used. The first optical sensor 131 (c.f. FIG. 1) may detect the position and the shape of the first surface FSF (c.f. FIG. 10G) and the position and the shape of a layer of the sealing agent formed on the first surface FSF. The second optical sensor 132 (c.f. FIG. 1) may detect the position and the shape of the second surface SSF (c.f. FIG. 10G). The shapes detected by the first and second optical sensors 131, 132 are stored in the second memory 452 as the shape data. On the basis of the shape detected by the first and second optical sensors 131, 132, the determination portion 460 which has read out shape data from the second memory 452 may find a thickness of the vehicle body SCS in an area on which the sealing agent is applied. For example, the determination portion 460 may be configured to calculate the thickness of the vehicle body SCS by performing a differential process between position coordinate data acquired by the first optical sensor 131 and position coordinate data acquired by the second optical sensor 132. The determination portion 460 compares the thickness of the vehicle body SCS with a predetermined threshold value to acquire a determination result indicating whether or not the sealing agent is appropriately applied. The determination result is outputted from the determination portion 460 to the determination processor 470. The determination processor 470 performs predetermined processes in response to the determination result. When the sealing agent is not appropriately applied, the determination processor 470 may inform an operator of inappropriate coating of the sealing agent or may perform other processes. The principles of the present embodiment are not limited to particular processes of the determination processor 470.

The robot 400A has an air control function like the robot 400 described with reference to FIG. 8 in addition to the aforementioned determination function. Accordingly, the description about the air control function of the robot 400 is applicable to the robot 400A.

Figure 12:
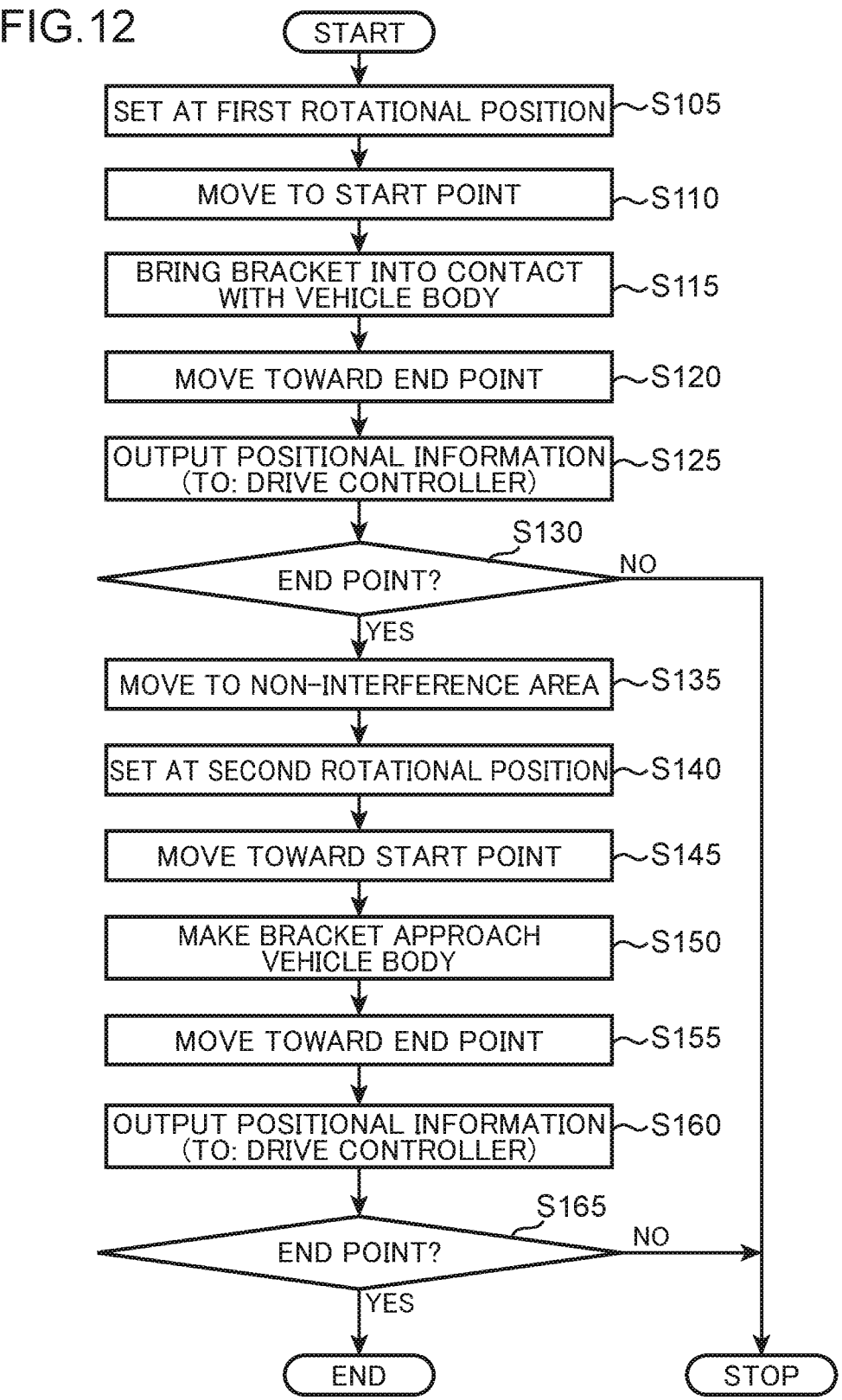
FIG. 12 is a schematic flowchart showing operations of a drive controller of the coating device shown in FIG. 11.

FIG. 12 is a schematic flowchart showing operations of the drive controller 411A of the robot 400A. The operations of the drive controller 411A are described with reference to FIGS. 2A, 2B, 9 to 12.

(Step S105)

The drive controller 411A generates a drive signal for rotating the bracket 110 about the x axis (cf. FIGS. 2A and 2B). The drive signal is outputted from the drive controller 411A to the drive portion 420. The drive portion 420 rotates the bracket 110 about the x axis in response to the drive signal. Accordingly, the bracket 110 is set at the first rotational position. Then, step S110 is performed.

(Step S110)

The drive controller 411A reads out the positional information from the first memory 451. The drive controller 411A generates a drive signal for moving the bracket 110 to the position indicated as the start point in the positional information. The start point may be the front or rear end of the wheel arch WAC (c.f FIGS. 2A and 2B). The drive signal for moving the bracket 110 to the start point position is outputted from the drive controller 411A to the drive portion 420. The drive portion 420 moves the bracket 110 on the imaginary plane which encompasses the y and z axes (c.f FIGS. 2A and 2B) in response to the drive signal. Accordingly, the bracket 110 is situated at the start point. Then, step S115 is performed.

(Step S115)

The drive controller 411A generates drive signals for causing a series of the operations of the bracket 110 described with reference to FIGS. 9 to 10G. The drive signals are outputted from the drive controller 411A to the drive portion 420. The drive portion 420 causes the series of the operations of the bracket 110 described with reference to FIGS. 9 to 10G in response to the drive signals. Accordingly, the gun bracket 200 and the coating gun 120 are set at the postures shown in FIG. 10G respectively. Then, step S120 is performed.

(Step S120)

The drive controller 411A generates a drive signal so that the bracket 110 moves along the movement trajectory indicated by the positional information read out from the first memory 451. The drive signal is outputted from the drive controller 411A to the drive portion 420. The drive portion 420 moves the bracket 110 in response to the drive signal. Accordingly, the bracket 110 moves along the wheel arch WAC. A coating position at which the sealing agent is applied moves along the hem edge 514. After the generation of the drive signal, step S125 is performed.

(Step S125)

The drive portion 420 which has received the drive signal outputs the positional information indicating the current position to the drive controller 411A. Then, step S130 is performed.

(Step S130)

The drive controller 411A determines whether or not the bracket 110 arrives at the position indicated as the end point in the positional information. The end point may be the rear or front end of the wheel arch WAC. When the bracket 110 arrives at the end point, step S135 is performed. Otherwise, predetermined stopping processes for stopping the robot 400A are performed.

(Step S135)

The drive controller 411A controls the drive portion 420 so as to move the bracket 110 to a position at which the bracket 110, the sensor device 130 and the coating gun 120 do not interfere with the vehicle body SCS. Then, step S140 is performed.

(Step S140)

The drive controller 411A generates a drive signal for rotating the bracket 110 about the x axis. The drive signal is outputted from the drive controller 411A to the drive portion 420. The drive portion 420 rotates the bracket 110 about the x axis in response to the drive signal. Accordingly, the bracket 110 is set to the second rotational position (c.f FIG. 2B). Then, step S145 is performed.

(Step S145)

The drive controller 411A reads out the positional information from the first memory 451. The drive controller 411A generates a drive signal for moving the bracket 110 to the position indicated as the start point in the positional information. The drive signal is outputted from the drive controller 411A to the drive portion 420. The drive portion 420 moves the bracket 110 on the imaginary plane which encompasses the y and z axes (c.f. FIGS. 2A and 2B) in response to the drive signal. Accordingly, the bracket 110 is positioned at the start point. Then, step S150 is performed.

(Step S150)

The drive controller 411A makes the bracket 110 approach the vehicle body to arrange the sensor device 130 at a position so that the sensor device 130 may detect a shape of the vehicle body at the start point. Then, step S155 is performed.

(Step S155)

The drive controller 411A generates a drive signal so that the bracket 110 moves along the movement trajectory indicated by the positional information read out from the first memory 451. The drive signal is outputted from the drive controller 411A to the drive portion 420. The drive portion 420 moves the bracket 110 in response to the drive signal. Accordingly, the bracket 110 moves along the wheel arch WAC. The detection area DTA moves along the hem edge 514. After the generation of the drive signal for moving the detection area DTA along the hem edge 514, step S160 is performed.

(Step S160)

The drive portion 420 which has received the drive signal outputs the positional information indicating the current position to the drive controller 411A. Then, step S165 is performed.

(Step S165)

The drive controller 411A determines whether or not the bracket 110 arrives at the position indicated as the end point in the positional information. When the bracket 110 arrives at the end point, step S135 is performed. Otherwise, predetermined stopping processes for stopping the robot 400A are performed.

Figure 13:
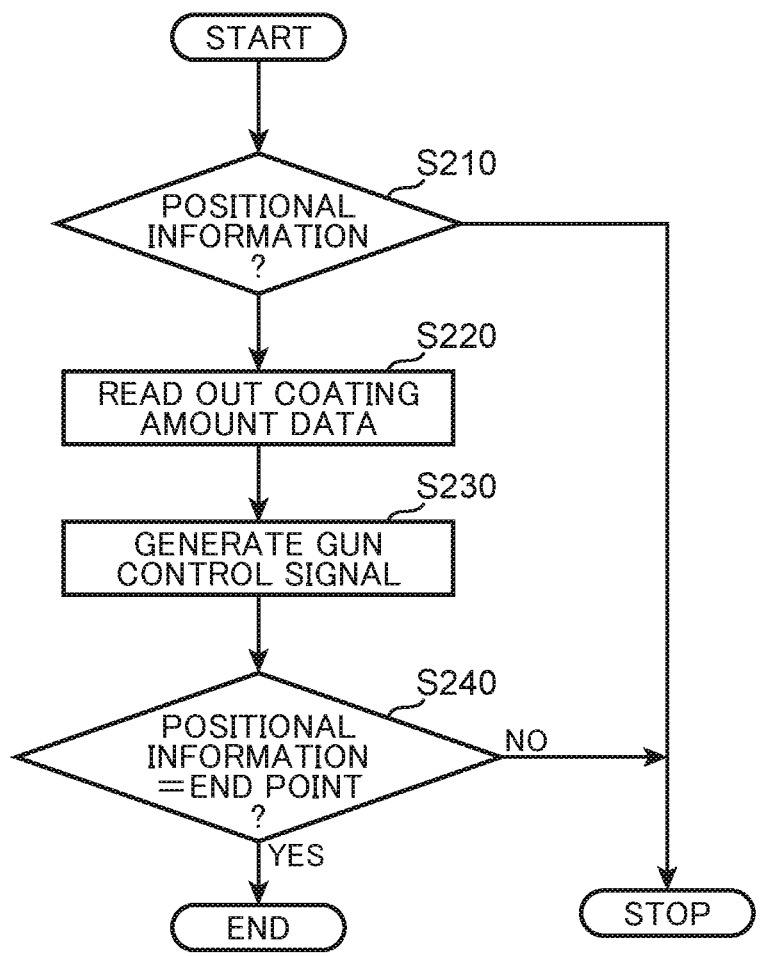
FIG. 13 is a schematic flowchart showing operations of a gun controller of the coating device shown in FIG. 11.

FIG. 13 is a schematic flowchart showing operations of the gun controller 413A configured to control the coating gun 120 in cooperation with the drive controller 411A. The operations of the drive controller 411A are described with reference to FIGS. 12 and 13.

(Step S210)

The gun controller 413A waits for an output of the positional information from the drive controller 411A (step S125 in FIG. 12). When the gun controller 413A receives the positional information from the drive controller 411A, step S220 is performed.

(Step S220)

The coating amount data associated with the position indicated by the positional information from the drive controller 411A is read out by the gun controller 413A from the first memory 451. After the coating amount data is read out, step S230 is performed.

(Step S230)

The gun controller 413A generates a gun control signal by which an application amount of the sealing agent is discharged from the coating gun 120, the application amount being indicated by the coating amount data. The gun control signal is outputted from the gun controller 413A to the coating gun 120. The coating gun 120 discharges the sealing agent in response to the gun control signal. Accordingly, a layer of the sealing agent is formed along the hem edge 514. After the generation of the gun control signal for discharging the sealing agent, step S240 is performed.

(Step S240)

The gun controller 413A which has generated the gun control signal determines whether or not the position indicated by the positional information is the end point. When the position indicated by the positional information indicates the end point, operations of the gun controller 413A are finished. Otherwise, predetermined stopping processes for stopping the robot 400A are performed.

<Third Embodiment>

The coating device may measure a shape of the vehicle body before the sealing agent is applied. The coating device may compare a shape of the vehicle body before the sealing agent is applied with a shape of the vehicle body after the application of the sealing agent to accurately detect a shape of a layer of the sealing agent. Exemplary detection techniques for detecting a shape of a layer of the sealing agent are described in the third embodiment.

Figure 14:
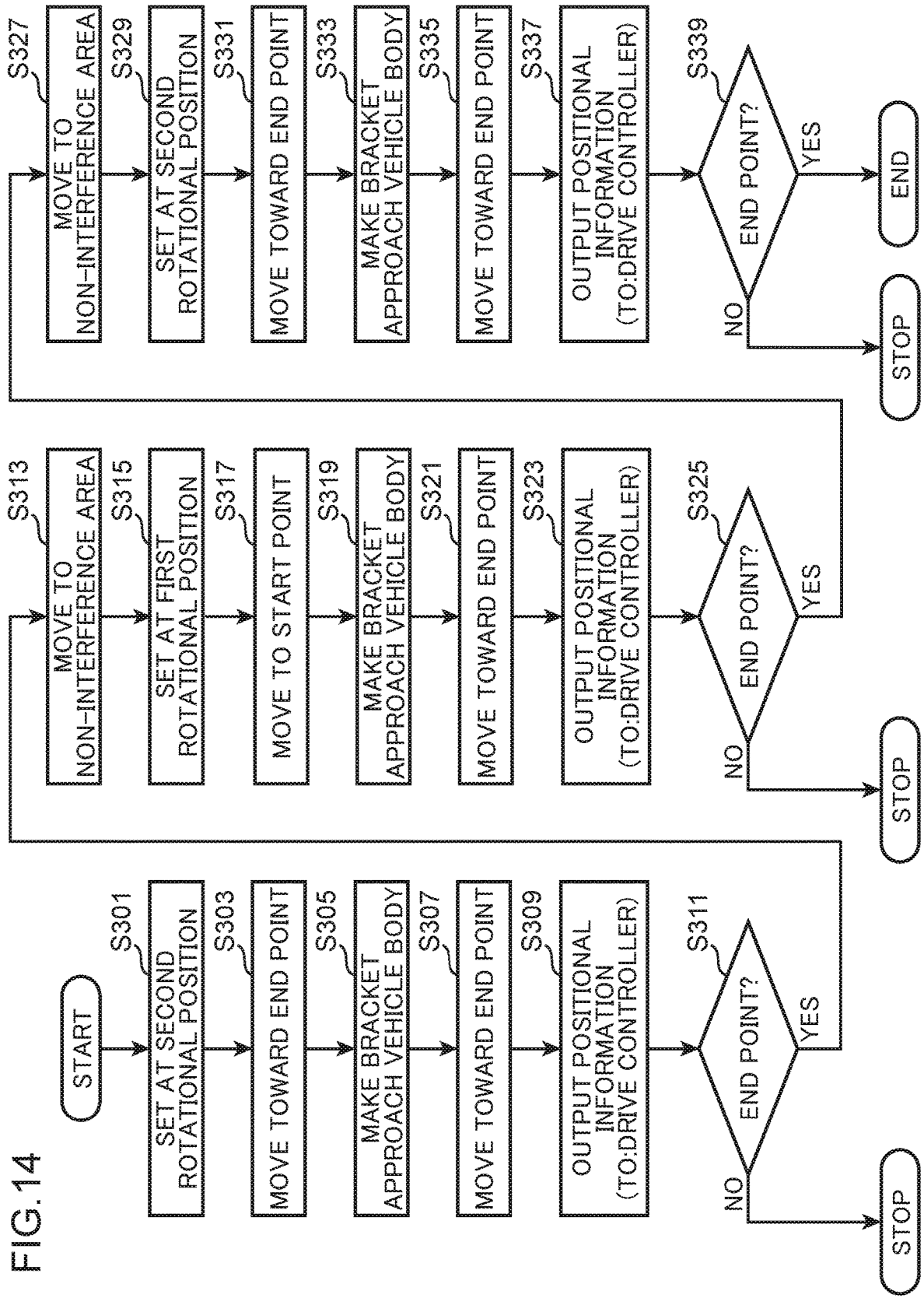
FIG. 14 is a schematic flowchart showing operations of the drive controller of the coating device shown in FIG. 11 (the third embodiment).

FIG. 14 is a schematic flowchart showing operations of the drive controller 411A. The operations of the drive controller 411A are described with reference to FIGS. 2A, 2B, 9 to 14.

(Step S301)

The drive controller 411A generates a drive signal for rotating the bracket 110 about the x axis (c.f. FIGS. 2A and 2B). The drive signal is outputted from the drive controller 411A to the drive portion 420. The drive portion 420 rotates the bracket 110 about the x axis in response to the drive signal. Accordingly, the bracket 110 is set to the second rotational position (c.f. FIG. 2B). Then, step S303 is performed.

(Step S303)

The drive controller 411A reads out the positional information from the first memory 451. The drive controller 411A generates a drive signal for moving the bracket 110 to the position indicated as the start point in the positional information. The drive signal is outputted from the drive controller 411A to the drive portion 420. In response to the drive signal, the drive portion 420 moves the bracket 110 on the imaginary plane which encompasses the y and z axes (c.f FIGS. 2A and 2B). Accordingly, the bracket 110 is positioned at the start point. Then, step S305 is performed.

(Step S305)

The drive controller 411A makes the bracket 110 approach the vehicle body, so that the sensor device 130 is arranged at a position so that the sensor device 130 may detect a shape of the vehicle body at the start point. Then, step S307 is performed.

(Step S307)

The drive controller 411A generates a drive signal so that the bracket 110 moves along the movement trajectory indicated by the positional information which has been read out from the first memory 451. The drive signal is outputted from the drive controller 411A to the drive portion 420. The drive portion 420 moves the bracket 110 in response to the drive signal. Accordingly, the bracket 110 moves along the wheel arch WAC. Meanwhile, the detection area DTA which is formed by the sensor device 130 mounted on the bracket 110 moves along the hem edge 514. After the generation of the drive signal for moving the detection area DTA, step S309 is performed.

(Step S309)

The drive portion 420 which has received the drive signal outputs the positional information indicating the current position to the drive controller 411A. Then, step S311 is performed.

(Step S311)

The drive controller 411A determines whether or not the bracket 110 arrives at the position indicated as the end point in the positional information. When the bracket 110 arrives at the end point, step S313 is performed. Otherwise, predetermined stopping processes for stopping the robot 400A are performed.

(Step S313)

The drive controller 411A moves the bracket 110 to a position at which the bracket 110, the sensor device 130 and the coating gun 120 do not interfere with the vehicle body by controlling the drive portion 420. Then, step S315 is performed.

(Step S315)

The drive controller 411A generates a drive signal for rotating the bracket 110 about the x axis (c.f FIGS. 2A and 2B). The drive signal is outputted from the drive controller 411A to the drive portion 420. The drive portion 420 rotates the bracket 110 about the x axis in response to the drive signal. Accordingly, the bracket 110 is set at the first rotational position. Then, step S317 is performed.

(Step S317)

The drive controller 411A reads out the positional information from the first memory 451. The drive controller 411A generates a drive signal for moving the bracket 110 to the position indicated as the start point in the positional information. The drive signal is outputted from the drive controller 411A to the drive portion 420. In response to the drive signal, the drive portion 420 moves the bracket 110 on the imaginary plane which encompasses the y and z axes (c.f. FIGS. 2A and 2B). Accordingly, the bracket 110 is positioned at the start point. Then, step S319 is performed.

(Step S319)

The drive controller 411A generates drive signals for causing a series of the operations of the bracket 110 described with reference to FIGS. 9 to 10G. The drive signals are outputted from the drive controller 411A to the drive portion 420. The drive portion 420 causes the series of the operations of the bracket 110 described with reference to FIGS. 9 to 10G in response to the drive signals. Accordingly, the gun bracket 200 and the coating gun 120 are set at postures shown in FIG. 10G respectively. Then, step S321 is performed.

(Step S321)

The drive controller 411A generates a drive signal so that the bracket 110 moves along the movement trajectory indicated by the positional information which has been read out from the first memory 451. The drive signal is outputted from the drive controller 411A to the drive portion 420. The drive portion 420 moves the bracket 110 in response to the drive signal. Accordingly, the bracket 110 moves along the wheel arch WAC. A coating position at which the sealing agent is applied moves along the hem edge 514. After the generation of the drive signal, step S323 is performed.

(Step S323)

The drive portion 420 which has received the drive signal outputs the positional information indicating the current position to the drive controller 411A. Then, step S325 is performed.

(Step S325)

The drive controller 411A determines whether or not the bracket 110 arrives at the position indicated as the end point in the positional information. When the bracket 110 arrives at the end point, step S327 is performed. Otherwise, predetermined stopping processes for stopping the robot 400A are performed.

(Step S327)

The drive controller 411A controls the drive portion 420 to moves the bracket 110 to a position so that the bracket 110, the sensor device 130 and the coating gun 120 do not interfere with the vehicle body. Then, step S329 is performed.

(Step S329)

The drive controller 411A generates a drive signal for rotating the bracket 110 about the x axis (c.f. FIGS. 2A and 2B). The drive signal is outputted from the drive controller 411A to the drive portion 420. The drive portion 420 rotates the bracket 110 about the x axis in response to the drive signal. Accordingly, the bracket 110 is set to the second rotational position (c.f. FIG. 2B). Then, step S331 is performed.

(Step S331)

The drive controller 411A reads out the positional information from the first memory 451. The drive controller

411A generates a drive signal for moving the bracket 110 to the position indicated as the start point in the positional information. The drive signal is outputted from the drive controller 411A to the drive portion 420. In response to the drive signal, the drive portion 420 moves the bracket 110 on the imaginary plane which encompasses the y and z axes (c.f. FIGS. 2A and 2B). Accordingly, the bracket 110 is situated at the start point. Then, step S333 is performed.

(Step S333)

The drive controller 411A makes the bracket 110 approach the vehicle body so that the sensor device 130 is arranged at a position so that the sensor device 130 may detect a shape of the vehicle body at the start point. Then, step S335 is performed.

(Step S335)

The drive controller 411A generates a drive signal so that the bracket 110 moves along the movement trajectory indicated by the positional information read out from the first memory 451. The drive signal is outputted from the drive controller 411A to the drive portion 420. The drive portion 420 moves the bracket 110 in response to the drive signal. Accordingly, the bracket 110 moves along the wheel arch WAC. Meanwhile, the detection area DTA moves along the hem edge 514. After the generation of the drive signal for moving the detection area DTA, step S337 is performed.

(Step S337)

The drive portion 420 which has received the drive signal outputs the positional information indicating the current position to the drive controller 411A. Then, step S339 is performed.

(Step S339)

The drive controller 411A determines whether or not the bracket 110 arrives at the position indicated as the end point in the positional information. When the bracket 110 arrives at the end point, the operations of the drive controller 411A are finished. Otherwise, predetermined stopping processes for stopping the robot 400A are performed.

Figure 15:
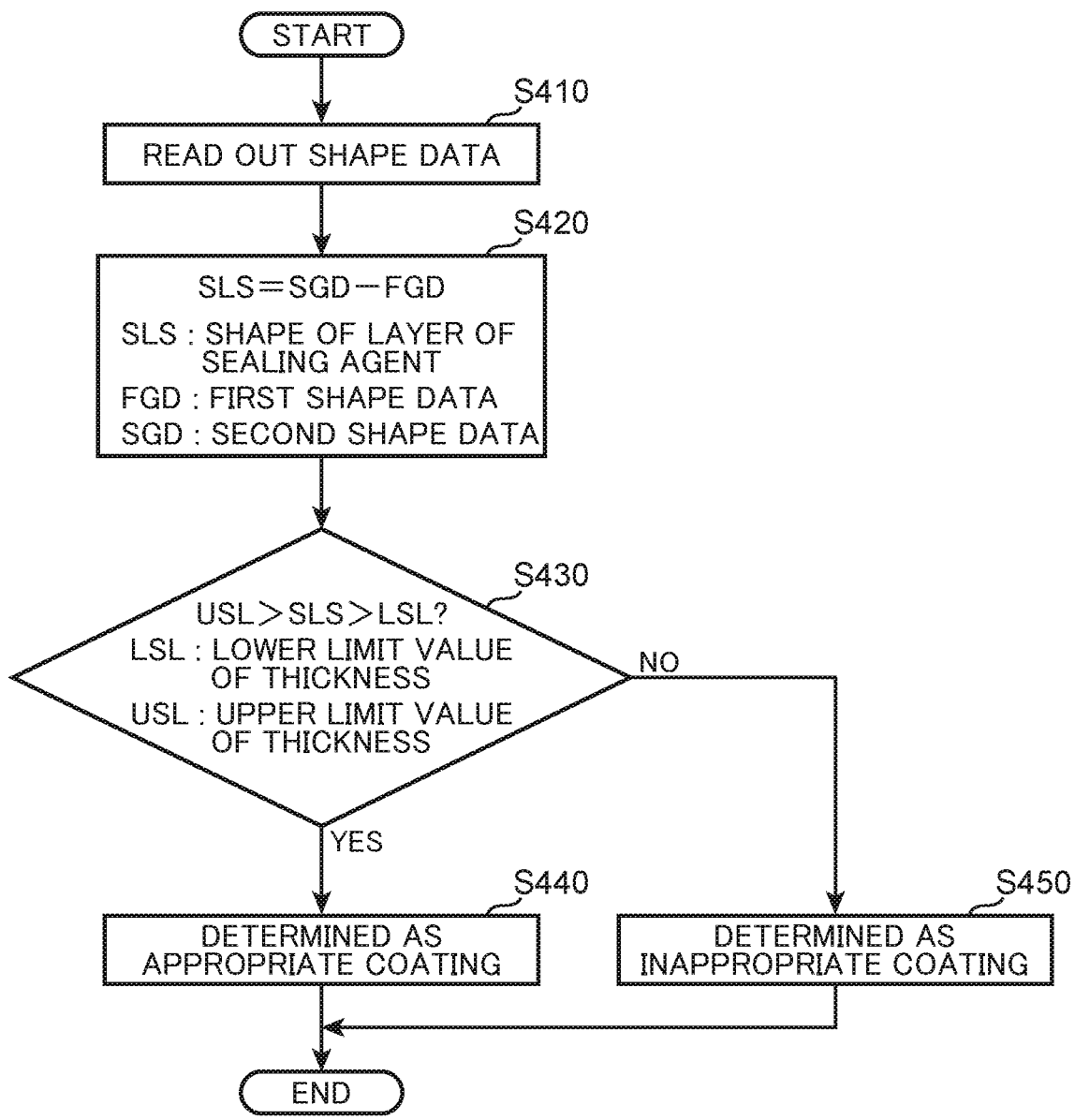
FIG. 15 is a schematic flowchart showing operations of a determination portion of the coating device shown in FIG. 11.

FIG. 15 is a schematic flowchart showing operations of the determination portion 460 after the driving operation of the drive controller 411A is finished. The operations of the determination portion 460 are described with reference to FIGS. 2A, 2B, 11, 14 and 15.

(Step S410)

When the operations of the drive controller 411A described with reference to FIG. 14 are completed, the determination portion 460 reads out the first shape data and the second shape data from the second memory 452. Then, step S420 is performed.

(Step S420)

The determination portion 460 subtracts the first shape data from the second shape data to generate shape data indicating a shape of a layer of the sealing agent. Then, step S430 is performed.

(Step S430)

The determination portion 460 finds out a thickness of the layer of the sealing agent from the shape data acquired from step S420. When the thickness of the layer of the sealing agent is above a lower limit threshold value and below an upper limit threshold value, step S440 is performed. Otherwise, step S450 is performed.

(Step S440)

The determination portion 460 determines that the sealing agent has been appropriately applied to the vehicle body SCS. The determination result is outputted from the determination portion 460 to the determination processor 470. The determination processor 470 may perform predetermined processes in response to the determination result indicating that the sealing agent has been appropriately applied to the vehicle body SCS.

(Step S450)

When the thickness of the layer of the sealing agent is below the lower limit threshold value, this means that there is a high risk of cracking in the layer of the sealing agent. When the thickness of the layer of the sealing agent is above the upper limit threshold value, this means that there is a high risk of the layer of the sealing agent being brought into contact with a tire (not shown) which rotates near the wheel arch WAC (c.f. FIGS. 2A and 2B). In these cases, the determination portion 460 determines that the sealing agent has not been appropriately applied to the vehicle body SCS. The determination result is outputted from the determination portion 460 to the determination processor 470. The determination processor 470 may perform predetermined processes in response to the determination result indicating that the sealing agent has not been appropriately applied to the vehicle body SCS (c.f. FIGS. 2A and 2B).

<Fourth Embodiment>

According to the third embodiment, it is possible to acquire the first shape data indicating a shape of the surface of the vehicle body before application of the sealing agent. The first shape data may be used for a determination process for determining whether or not coating of the sealing agent should be performed. Exemplary determination processes for determining whether or not coating of the sealing agent should be performed is described in the fourth embodiment.

Figure 16:
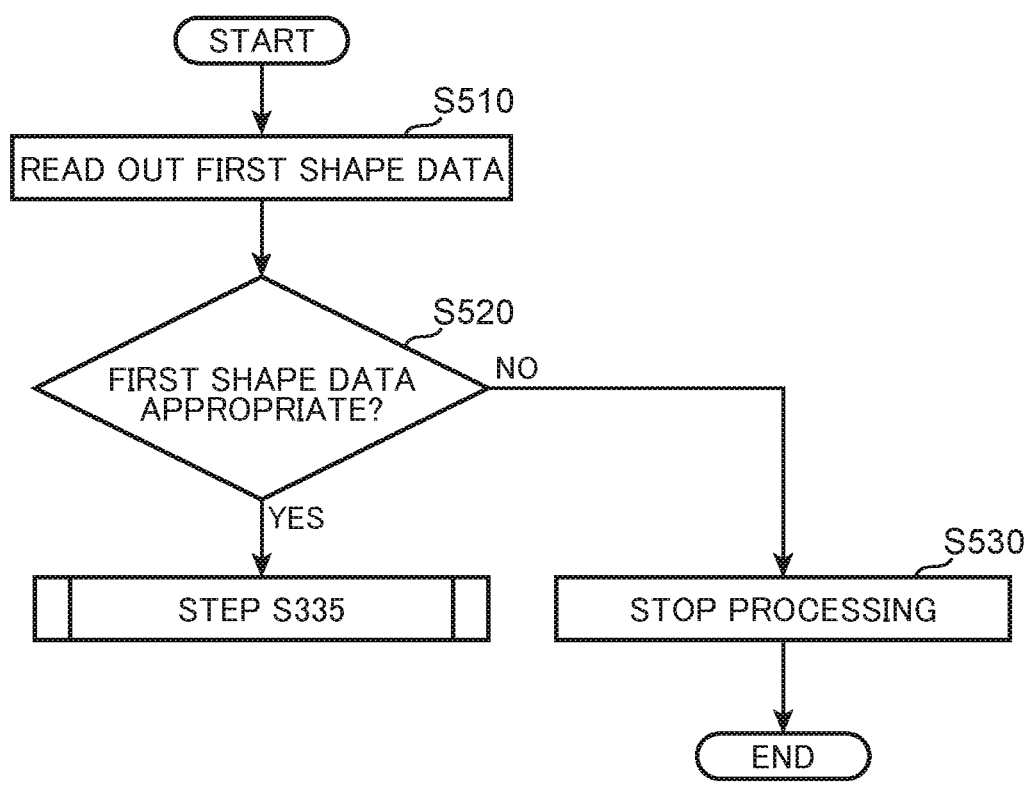
FIG. 16 is a schematic flowchart showing operations of the determination portion of the coating device shown in FIG. 11 (the fourth embodiment).

FIG. 16 is a schematic flowchart showing operations of the determination portion 460. The operations of the determination portion 460 are described with reference to FIGS. 11, 14 and 16.

The processes shown in FIG. 16 are performed during a transition period from step S330 to step S335 described with reference to FIG. 14.

(Step S510)

The determination portion 460 reads out the first shape data from the second memory 452. Then, step S520 is performed.

(Step S520)

The determination portion 460 determines whether or not there is abnormality in first shape data. The determination portion 460 may have a predetermined threshold value data to be compared with the first shape data. The determination portion 460 may compare the first shape data with the threshold value data. When the first shape data is not largely different from the threshold value data, step S335 is performed. When the first shape data is largely different from the threshold value data, step S530 is performed.

(Step S530)

The determination portion 460 performs stopping processes for stopping operations of the robot 400A.

The aforementioned various technical features may be combined with each other or may be altered so as to meet requirements of various manufacturing sites.

Known robot techniques may be applied to the robot for operating the coating gun. Accordingly, the principles of the present embodiment are not limited to a particular structure of the robot.

The exemplary techniques described in the context of the aforementioned various embodiments mainly include the following features.

A coating device according to one aspect of the aforementioned embodiments includes: a coating gun configured to apply a coating agent to an object; a sensor device configured to form a detection area in which the coating agent is detected on the object; a bracket on which the coating gun and the sensor device are mounted; and a robot configured to hold and rotate the bracket about a predetermined first axis of rotation. When the robot rotates the bracket from a first rotational position, at which the coating gun applies the coating agent to a coating position on the object, to a second rotational position in which the bracket is angularly changed by a predetermined rotational angle about the first axis of rotation, the detection area overlaps with the coating position.

According to the aforementioned configuration, when the coating gun applies a coating agent to the object, the sensor device forms a detection area in which the coating agent on the object is detected. Accordingly, the sensor device may detect whether or not the coating agent is appropriately applied to the object. The robot holds the bracket on which the coating gun and the sensor device are mounted, and rotates the bracket about the predetermined first axis of rotation. Accordingly, an operator may perform not only applying the coating agent using the coating device but also inspecting whether or not the coating agent is appropriately applied to the object. It is not necessary to replace the coating device with an inspection device and convey the object to the inspection device. Accordingly, it is simplified to inspect whether or not the coating agent is appropriately applied to the object. When the bracket is rotated from the first rotational position at which the coating gun applies the coating agent to a coating position on the object to the second rotational position in which the bracket is angularly changed by a predetermined rotational angle about the first axis of rotation, the detection area overlaps with the coating position, so that a relative positional relationship between the first axis of rotation and the object is maintained. Accordingly, the sensor device may accurately detect whether or not the coating agent is appropriately applied.

With regard to the aforementioned configuration, the object may have a first surface to which the coating agent is applied, and a second surface opposite to the first surface. The sensor device may include a first optical sensor configured to radiate first light to the first surface to detect a position of the first surface when the bracket is at the second rotational position, and a second optical sensor configured to radiate second light to the second surface to detect a position of the second surface when the bracket is at the second rotational position. The detection area may be formed by overlaying the first light with the second light.

According to the aforementioned configuration, when the bracket is at the second rotational position, the first and second optical sensors radiate first and second lights to the first and second surfaces. Accordingly, positions of the first and second surfaces may be found. The detection area is formed by overlaying the first light with the second light, so that a thickness of the object may be found in the detection area.

With regard to the aforementioned configuration, the first optical sensor may be a laser sensor configured to radiate a laser beam as the first light. The second optical sensor may be another laser sensor configured to radiate another laser beam as the second light.

According to the aforementioned configuration, the laser sensors are used as the first and second optical sensors. Accordingly, a thickness of the object may be detected in the detection area accurately without being affected by environmental light around the sensor device.

With regard to the aforementioned configuration, the object may include a main plate portion which forms the second surface, and a hem strip which is bent along a bent edge from the main plate portion to form a part of the first surface. The coating agent may be a sealing agent. The hem strip may include a hem edge which extends at a position distant from the bent edge. The coating position may be formed on the hem edge.

According to the aforementioned configuration, the coating position is formed on the hem edge which extends at a position distant from the bent edge. Accordingly, the sealing agent may prevent a liquid from flowing into a space between the main plate portion and the hem strip.

With regard to the aforementioned configuration, the bent edge may form a wheel arch. The coating agent may be a sealing agent. While the robot moves the first axis of rotation along the wheel arch, the sealing agent may be applied to the hem edge which is bent along the wheel arch.

With regard to the aforementioned configuration, the sealing agent is applied to the hem edge which is bent along the wheel arch while the robot moves the first axis of rotation along the wheel arch. Accordingly, the coating device may apply the sealing agent over the whole hem edge. In addition, the coating device may inspect whether or not the sealing agent is appropriately applied over the whole hem edge.

With regard to the aforementioned configuration, the bracket may include: a first slider mechanism configured to allow movement of the coating gun along a first axis extending in parallel to the first axis of rotation; a second slider mechanism configured to allow movement of the coating gun along a second axis extended in a direction orthogonal to the first axis; a swing shaft portion configured to allow the coating gun to swing about a third axis extended in a direction orthogonal to the first and second axes; a first contact portion configured to be brought into pressure contact with the second surface by the first slider mechanism; and a second contact portion configured to be brought into pressure contact with the bent edge by the second slider mechanism. The robot may move the bracket with bringing the first contact portion into contact with the second surface and the second contact portion into contact with the bent edge.

According to the aforementioned configuration, the first and second slider mechanisms of the bracket allow a movement of the coating gun in directions along the first and second axes. Accordingly, when the robot moves the bracket with bringing the first contact portion into contact with the second surface and the second contact portion into contact with the bent edge, a position of the coating gun may be changed in an extension direction of the first axis as well as in an extension direction of the second axis in accordance with a shape of the object. The swing shaft portion allows the coating gun to swing around the third axis, so that an angle of the coating gun with respect to the first surface is also adjusted in accordance with a shape of the object when the first contact portion is brought into contact with the second surface and the second contact portion is brought into contact with the bent edge. A position and a direction of the coating gun are adjusted in accordance with a shape of the object without an excessively accurate teaching process. In short, even when a movement trajectory of the bracket which is determined by the robot does not so accurately match the shape of the object, the bracket may adjust the position and the direction of the coating gun in accordance with the shape of the object. Accordingly, the teaching process may require a largely reduced time and largely reduced efforts.

With regard to the aforementioned configuration, the bracket may include a first bracket member on which the first and second contact portions are mounted. The first contact portion includes ball rollers aligned in an extension direction of the second axis. When the robot moves the first bracket member toward the second surface, the first bracket member is angularly displaced around the swing shaft portion so that the ball rollers are brought into point contact with the second surface. The first slider mechanism may bring the ball rollers into pressure contact with the second surface.

With regard to the aforementioned configuration, when the robot moves the first bracket toward the second surface, the first bracket is angularly displaced around the swing shaft portion so that the ball rollers are brought into point contact with the second surface. Accordingly, an angle of the coating gun mounted on the bracket is adjusted in accordance with a shape of the object. The first slider mechanism brings the ball rollers into pressure contact with the second surface. Accordingly, an angle of the coating gun is continuously adjusted while the bracket is moved by the robot.

With regard to the aforementioned configuration, the second contact portion may include a guide roller configured to be rotated about a second axis of rotation which extends in parallel to the first axis, the guide roller having a circumferential surface configured to be brought into contact with the bent edge. The second slider mechanism may bring the circumferential surface of the guide roller into pressure contact with the bent edge. The robot may move the bracket with allowing the ball rollers to roll on the second surface and the guide roller to rotate on the bent edge.

According to the aforementioned configuration, the circumferential surface of the guide roller is brought into contact with the bent edge of the object, so that the guide roller rotates about the second axis of rotation which extends in parallel to the first axis when the bracket is moved by the robot. During the rotation, the ball rollers roll on the second surface. Accordingly, the bracket may smoothly move along the bent edge.

With regard to the aforementioned configuration, the bracket may include a holding bracket portion configured to hold the coating gun The first slider mechanism may include a first press slider configured to bring the ball rollers into pressure contact with the second surface, and a first displacement slider configured to allow movement of the holding bracket portion relative to the first bracket member. When the robot operates the first displacement slider to displace the holding bracket portion along the first axis relative to the first bracket member, the coating gun may approach the first surface.

According to the aforementioned configuration, when the robot operates the first displacement slider so as to move the holding bracket portion relative to the first bracket along the first axis, the coating gun approaches the first surface, so that the coating agent is efficiently applied to the first surface. The first press slider brings the ball rollers into pressure contact with the second surface, so that the position of the coating gun which approaches the first surface is maintained while the robot moves the bracket.

With regard to the aforementioned configuration, the holding bracket portion may include a second bracket member connected to the first displacement slider, and a third bracket member on which the coating gun is mounted. The second slider mechanism may include a second press slider configured to bring the peripheral surface of the guide roller into pressure contact with the bent edge, and a second displacement slider connected to the second and third bracket members so that the third bracket member moves relative to the second bracket member. The robot may operate the second displacement slider to adjust a position of the coating gun in the extension direction of the second axis.

According to the aforementioned configuration, the second bracket member is connected to the first displacement slider, so that the second bracket member may move along the first axis relative to the first bracket when the robot operates the first displacement slider. The third bracket member is connected to the second bracket member by way of the second displacement slider, so that the third bracket member moves along the first axis together with the second bracket member relative to the first bracket member. The second press slider brings the circumferential surface of the guide roller into pressure contact with the bent edge, so that the coating gun is displaced in accordance with the shape of the bent edge. The robot adjusts the position of the coating gun in the extension direction of the second axis by operating the second displacement slider, so that the coating position of the coating agent is adjusted under the operation of the robot.

With regard to the aforementioned configuration, the bracket may include a fourth bracket member on which the first press slider is mounted, a fifth bracket member connected to the first and second press sliders so that the fifth bracket member moves in the extension direction of the first axis relative to the fourth bracket member, and a sixth bracket member configured to hold the swing shaft portion and connected to the second press slider. The sixth bracket member may be movable in the extension direction of the second axis relative to the fifth bracket member. The holding bracket portion may be connected to the sixth bracket member.

According to the aforementioned configuration, the first press slider is connected to the fourth and fifth bracket members, so that the fifth bracket member may be pushed out in the extension direction of the first axis from the fourth bracket member. The sixth bracket member is connected to the fifth bracket member by way of the second press slider, so that the sixth bracket member is pushed out in the extension direction of the second axis from the fifth bracket member. The holding bracket portion is connected to the sixth bracket member, so that the position of the holding bracket along the first and second axes and the angular position of the holding bracket around the swing shaft portion are adjusted in accordance with the shape of the object while the robot moves the bracket. The coating gun is held by the holding bracket, so that the position and the direction of the coating gun are adjusted in accordance with the shape of the object. Accordingly, a teaching process does not have to be not excessively accurate.

A coating method according to another aspect of the aforementioned embodiment includes: applying a coating agent from a coating gun to an object; rotating a bracket, on which the coating gun and a sensor device are mounted, about a predetermined first axis of rotation to make a detection area match the coating agent on the object to detect the coating agent on the object, the sensor device being configured to form the detection area; and detecting a shape of the coating agent on the object.

According to the aforementioned configuration, when the coating gun applies a coating agent to the object, the sensor device forms a detection area in which the coating agent is detected on the object. Accordingly, the sensor device may detect whether or not the coating agent is appropriately applied to the object. When the bracket on which the coating gun and the sensor device are mounted is rotated about the predetermined first axis of rotation, the detection area matches a coating agent on the object, so that it is not necessary to replace the coating device with an inspection device and convey the object to the inspection device. Accordingly, it is simplified to inspect whether or not a coating agent is appropriately applied to the object. As a result of the rotation of the bracket, the detection area matches the coating agent, so that a relative positional relationship between the first axis of rotation and the object may be maintained. Accordingly, the sensor device may accurately detect whether or not a coating agent is appropriately applied.

With regard to the aforementioned configuration, the coating method may further include making the detection area match the coating position on the object before the coating agent is applied to the object to detect a surface shape of the object at the coating position. The applying the coating agent to the object from the coating gun may include rotating the bracket about the first axis of rotation to arrange the coating gun at a position so that the coating agent is applied to the coating position. The detecting the shape of the coating agent on the object may include comparing first shape data acquired from the detecting the surface shape of the object before the coating agent is applied to the object with second shape data acquired from the detecting a surface shape of the object to which the coating agent has been applied.

According to the aforementioned configuration, the coating method includes detecting a surface shape of an object at a coating position by aligning a detection area with a coating position on the object before a coating agent is applied to the object, so that the coating agent is applied in accordance with a surface shape of the object before the coating agent is applied. When an operator rotates the bracket about the first axis of rotation after the detection of the surface shape of the object and before the application of the coating agent to the object, the coating position matches the detection area, so that the detection of the surface shape of the object before the application of the coating agent to the object and coating of the coating agent can be smoothly performed. When the first shape data acquired from detecting the surface shape of the object before the coating agent is applied to the object is compared with the second shape data acquired from the detecting a surface shape of the object to which the coating agent has been applied, the shape of the coating agent on the object is detected.

With regard to the aforementioned configuration, the object may include a first surface to which the coating agent is applied, and a second surface opposite to the first surface. The second surface may be formed of a main plate portion. The first surface may be partially formed of a hem strip bent along a bent edge from the main plate portion. The hem strip may include a hem edge which extends at a position distant from the bent edge. The coating agent may be a sealing agent. The applying the coating agent to the object from the coating gun may include arranging the coating gun at a position so that the sealing agent is applied to the hem edge.

According to the aforementioned configuration, the applying the coating agent to the object from the coating gun includes arranging the coating gun at a position so that the sealing agent is applied to the hem edge. Therefore, the sealing agent may prevent a liquid from flowing into a space between the main plate portion and the hem strip.

With regard to the aforementioned configuration, the bent edge may form a wheel arch. The hem edge may be bent along the wheel arch. The applying the coating agent to the object from the coating gun may include moving the coating gun along the bent hem edge with discharging the sealing agent.

According to the aforementioned configuration, the applying the coating agent to the object from the coating gun includes moving the coating gun along the bent hem edge with discharging the sealing agent, so that the sealing agent may prevent a liquid from flowing into a space between the main plate portion and the hem strip.

With regard to the aforementioned configuration, the coating method may further include determining it based on the first shape data and the second shape data whether or not the coating agent is appropriately applied.

According to the aforementioned configuration, when first shape data acquired from the detecting the surface shape of the object before the coating agent is applied to the object is compared with the second shape data acquired from the detecting a surface shape of the object to which the coating agent has been applied, the shape of the coating agent is detected on the object. Accordingly, it is easily determined from the shape of the coating agent on the object whether or not the coating agent has been appropriately applied.

INDUSTRIAL APPLICABILITY

The principles of the aforementioned embodiments are preferably used at various manufacturing sites.

The invention claimed is:

1. A coating device comprising: a coating gun configured to apply a coating agent to an object, the object having a first surface to which the coating agent is applied, and a second surface which is opposite of the first surface;
    a sensor device including a first optical sensor configured to radiate a first light to the first surface to detect a position of the first surface, and a second optical sensor configured to radiate a second light to the second surface to detect a position of the second surface, said first surface faces the first optical sensor and said second surface faces the second optical sensor;
    the first optical sensor and the second optical sensor being situated so that the first light and the second light overlay with each other to form a detection area in which the coating agent is detected on the object such that the object is situated across the between the first optical sensor and the second optical sensor, a bracket on which the coating gun and the sensor device are mounted; and a robot configured to hold and rotate the bracket about a predetermined first axis of rotation, wherein when the robot rotates the bracket from a first rotational position, at which the coating gun applies the coating agent to a position of the coating on the object, to a second rotational position in which the bracket is angularly changed by a predetermined rotational angle about the first axis of rotation, the detection area overlaps with the position of the coating and the first optical sensor and the second optical sensor face each other.

2. The coating device according to claim 1,
    wherein the first optical sensor is a laser sensor configured to radiate a laser beam as the first light, and
    wherein the second optical sensor is another laser sensor configured to radiate another laser beam as the second light.

3. The coating device according to claim 1,
    wherein the object includes a main plate portion which forms the second surface, and a hem strip which is bent along a bent edge from the main plate portion to form a part of the first surface, wherein the coating agent is a sealing agent,
wherein the hem strip includes a hem edge which extends at a position distant from the bent edge, and
wherein the coating position is formed on the hem edge.

4. The coating device according to claim 3,
wherein the bent edge forms a wheel arch,
wherein the sealing agent is applied to the hem edge which is bent along the wheel arch while the robot moves the first axis of rotation along the wheel arch.

5. The coating device according to claim 3,
wherein the bracket includes: a first slider configured to allow movement of the coating gun along a first axis extending in parallel to the first axis of rotation; a second slider configured to allow movement of the coating gun along a second axis extended in a direction orthogonal to the first axis; a swing shaft portion configured to allow the coating gun to swing about a third axis extended in a direction orthogonal to the first and second axes; a first contact portion configured to be brought into pressure contact with the second surface by the first slider; and a second contact portion configured to be brought into pressure contact with the bent edge by the second slider, and
wherein the robot moves the bracket with bringing the first contact portion into contact with the second surface and the second contact portion into contact with the bent edge.

6. The coating device according to claim 5,
wherein the bracket includes a first bracket member on which the first and second contact portions are mounted,
wherein the first contact portion includes ball rollers aligned in an extension direction of the second axis,
wherein when the robot moves the first bracket member toward the second surface, the first bracket member is angularly displaced around the swing shaft portion so that the ball rollers are brought into point contact with the second surface, and
wherein the first slider brings the ball rollers into pressure contact with the second surface.

7. The coating device according to claim 6,
wherein the second contact portion includes a guide roller configured to be rotated about a second axis of rotation which extends in parallel to the first axis, the guide roller having a circumferential surface configured to be brought into contact with the bent edge,
wherein the second slider brings the circumferential surface of the guide roller into pressure contact with the bent edge, and
wherein the robot moves the bracket with allowing the ball rollers to roll on the second surface and the guide roller to rotate on the bent edge.

8. The coating device according to claim 7,
wherein the bracket includes a holding bracket portion configured to hold the coating gun,
wherein the first slider includes a first press slider configured to bring the ball rollers into pressure contact with the second surface, and a first displacement slider configured to allow movement of the holding bracket portion relative to the first bracket member, and
wherein when the robot operates the first displacement slider to displace the holding bracket portion along the first axis relative to the first bracket member, the coating gun approaches the first surface.

9. The coating device according to claim 8,
wherein the holding bracket portion includes a second bracket member connected to the first displacement slider, and a third bracket member on which the coating gun is mounted,
wherein the second slider includes a second press slider configured to bring the circumferential surface of the guide roller into pressure contact with the bent edge, and a second displacement slider connected to the second and third bracket members so that the third bracket member moves relative to the second bracket member, and
wherein the robot operates the second displacement slider to adjust a position of the coating gun in the extension direction of the second axis.

10. The coating device according to claim 9,
wherein the bracket includes a fourth bracket member on which the first press slider is mounted, a fifth bracket member connected to the first and second press sliders so that the fifth bracket moves in an extension direction of the first axis relative to the fourth bracket member, and a sixth bracket member configured to hold the swing shaft portion and connected to the second press slider,
wherein the sixth bracket member is movable in the extension direction of the second axis relative to the fifth bracket member, and
wherein the holding bracket portion is connected to the sixth bracket member.

* * * * *